US012567940B2

(12) United States Patent
Preciado

(10) Patent No.: US 12,567,940 B2
(45) Date of Patent: Mar. 3, 2026

(54) METHOD FOR AUTOMATIC ENROLLMENT OF DEVICES INTO A SYNCHRONIZED MESH NETWORK

(71) Applicant: PassiveLogic, Inc., Salt Lake City, UT (US)

(72) Inventor: Marciano Preciado, Salt Lake City, UT (US)

(73) Assignee: PassiveLogic, Inc., Holladay, UT (US)

( * ) Notice: Subject to any disclaimer, the term of this patent is extended or adjusted under 35 U.S.C. 154(b) by 624 days.

(21) Appl. No.: 17/986,603

(22) Filed: Nov. 14, 2022

(65) Prior Publication Data

US 2024/0163066 A1     May 16, 2024

(51) Int. Cl.
H04L 5/00 (2006.01)
(52) U.S. Cl.
CPC .......... H04L 5/0094 (2013.01); H04L 5/0032 (2013.01)
(58) Field of Classification Search
CPC ............................ H04L 5/0094; H04L 5/0032
See application file for complete search history.

(56) References Cited

U.S. PATENT DOCUMENTS

| | | | | |
|---|---|---|---|---|
| 9,179,475 | B2 * | 11/2015 | Koleszar | ............... H04W 40/00 |
| 2009/0168703 | A1 * | 7/2009 | Pandey | ................. H04W 8/005 |
| | | | | 370/329 |
| 2013/0242905 | A1 * | 9/2013 | Rasband | .......... H04W 74/0816 |
| | | | | 370/329 |
| 2017/0265153 | A1 * | 9/2017 | Grady | ................. H04W 56/001 |
| 2019/0208381 | A1 * | 7/2019 | Booij | ...................... G01S 1/725 |

* cited by examiner

*Primary Examiner* — Candal Elpenord

(57) ABSTRACT

Various embodiments described herein relate to a method, apparatus, and a non-transitory machine-readable storage medium including one or more of the following: receiving a message that a sub-channel is available; receiving a message comprising N, H, a sub-channel duration and a sync sub-channel number; determining sync up channel number or down channel number using N, H, and sub-channel number; determining sync EMG using N, H, and sub-channel duration; sending a message to the sync down channel EMG indicating that the sensor device requests to be a child of the sub-channel; and receiving a response during the synch.

20 Claims, 16 Drawing Sheets

100

300

200

1400

1500a

Up Channel 1 (C)

1500b

Down Channel 2 (C)

1600

1625

1630

1630

1615    1620

1700a

Up Channel 0 (R)

1705a    1710a    1715a

1700b

Down Channel 6 (R)

1705b    1710b    1715b

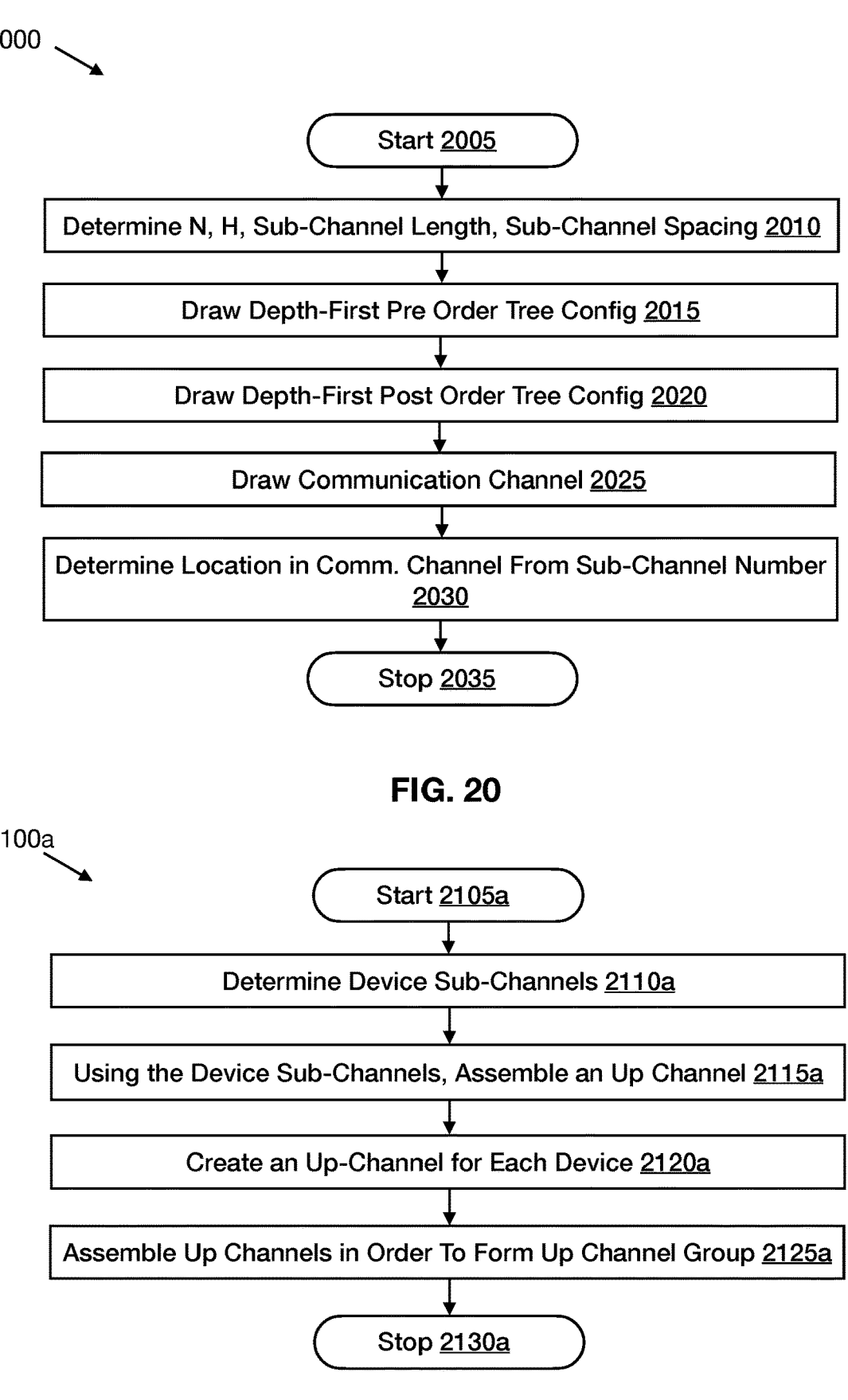

2000

Start 2005

Determine N, H, Sub-Channel Length, Sub-Channel Spacing 2010

Draw Depth-First Pre Order Tree Config 2015

Draw Depth-First Post Order Tree Config 2020

Draw Communication Channel 2025

Determine Location in Comm. Channel From Sub-Channel Number 2030

Stop 2035

Start 2105a

Determine Device Sub-Channels 2110a

Using the Device Sub-Channels, Assemble an Up Channel 2115a

Create an Up-Channel for Each Device 2120a

Assemble Up Channels in Order To Form Up Channel Group 2125a

Stop 2130a

Start 2105b

Create Device Sub-Channels 2110b

Using the Device Sub-Channels, Create a Down Channel 2115b

Create a Down-Channel for Each Device 2120b

Assemble Down Channels in Order To Form a Down Channel Group 2125b

Stop 2130b

2200

Start 2205

Use the Up Channel Group and the Down-Channel Group To Create a Communication Channel 2210

Repeat the Communication Channel 2215

Stop 2220

2400

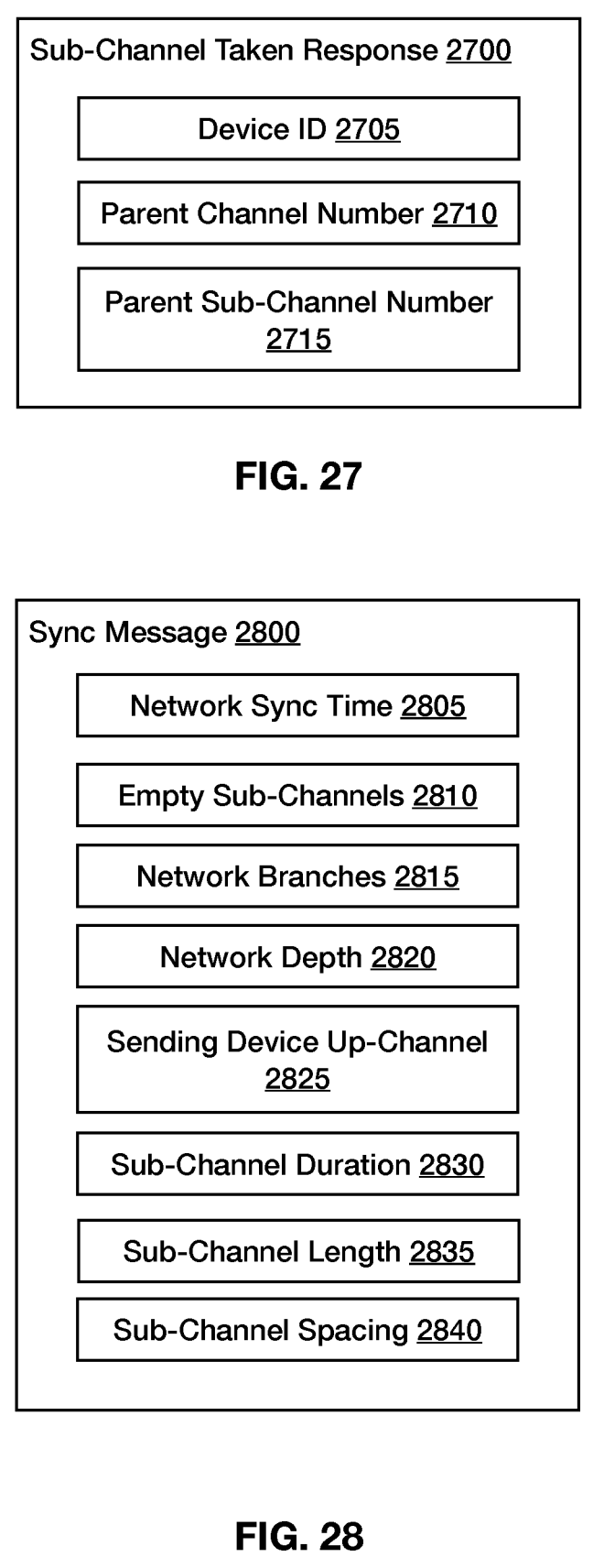

Sub-Channel Taken Response <u>2700</u>

Device ID <u>2705</u>

Parent Channel Number <u>2710</u>

Parent Sub-Channel Number <u>2715</u>

FIG. 27

Sync Message <u>2800</u>

Network Sync Time <u>2805</u>

Empty Sub-Channels <u>2810</u>

Network Branches <u>2815</u>

Network Depth <u>2820</u>

Sending Device Up-Channel <u>2825</u>

Sub-Channel Duration <u>2830</u>

Sub-Channel Length <u>2835</u>

Sub-Channel Spacing <u>2840</u>

FIG. 28

METHOD FOR AUTOMATIC ENROLLMENT OF DEVICES INTO A SYNCHRONIZED MESH NETWORK

FIELD OF INVENTION

Various embodiments described herein relate to mesh networks and more specifically, but not exclusively, to a framework for creating and using low power mesh networks.

BACKGROUND

IOT devices can be very useful for monitoring a wide variety of things, yet they can be very difficult to implement at scale. Some reasons for difficulty scaling are: complexity in organizing large networks, time cost to setup many devices with dedicated power and, conversely, time cost to maintain a large number of battery operated devices if one wishes to forgo wiring many devices. Battery operated, wireless devices also have scaling limitations, in that individual devices can have limiting ranges to their wireless communication methods. Range can be extended by incorporating relay devices to produce a mesh network. Networking devices as such often consume considerable power to be available for communication which can severely limit battery-operated-devices' lifetimes. This power consumption can be minimized by scheduling communications between devices to reduce wasted energy usage. Organizing such a network of synchronized devices with coordinated communication manually is a complex task for an installer. Further, even after devices are set up, power usage may be a problem when power options are limited.

SUMMARY

This summary is provided to introduce a selection of concepts in a simplified form that are further described below in the Detailed Description section. This summary does not identify required or essential features of the claimed subject matter. The innovation is defined with claims, and to the extent this Summary conflicts with the claims, the claims should prevail.

In embodiments, a method performed by a device to add another device to an existing device mesh network is disclosed. This method includes receiving a synchronization message that a sub-channel is available; using information in the synchronization message to determine an appropriate transmission time; sending a sub-channel request message at the talking time; receiving a response message; and when an indication from the response message is a yes, then the device enrolling itself as a child of a sender of the sync message, the sender of the sync message becoming a parent.

In embodiments, the response message may include a yes/no indication and an available sub-channel number.

In embodiments, the information in the sync message may include an available sub-channel, a sending device up channel number, a network branch number, a network sync time, and a network depth number.

In embodiments, the device enrolling itself as a child of the sender of the sync message may include using the network branch number, the network depth number and the sending device up channel number to determine a down channel number; using the down channel number, determine a parent sub-channel response time; sleeping; waking at the parent sub-channel response time; and sending a sub-channel taken message at the parent sub-channel response time.

In embodiments, using the network branch number, the network depth number and the sending device up channel to determine a down channel number includes using the network branch number and the network depth number to build a depth-first post-ordered tree that associates the sending device up channel number with the down channel number.

In embodiments, further including using a sub-channel duration, the sending device up channel number and the down channel number to build a complete up channel group and a complete down channel group; using the complete up channel group and the complete down channel group to determine a down EMG sub channel time; and using the down EMG sub channel time to determine the talking time.

In embodiments, the sub-channel duration is included in the information in the sync message.

In embodiments, receiving a response message includes the device waking up during during a sync channel time of the sender of the sync message.

In embodiments, the device sleeps between the sending a sub-channel request message and the receiving a response message.

In embodiments, a divide is disclosed with a memory, a distributed computer program a communications interface, connected to a distributed computer program; and a processor in communication with the memory and the communications interface. The processor may be configured to receive, via the communications interface, a sync message that includes a sub-channel number; using information in the sync message, determine a parent EMG time; sleep; wake at the parent EMG time; send a request message at the parent EMG time, the request message including the sub-channel number; sleep; wake at a response message time; receive a response message including a yes/no indication, and an available sub-channel number; and when the yes/no indication is a yes, then the device assigning itself to a sender of the sync message.

In embodiments, the device assigning itself to a sender of the sync message may include determining a parent listening time; sleeping; and sending a sub-channel taken message to the sender of the sync message at the parent listening time.

In embodiments, the sub-channel taken message may include a device ID, and the available sub-channel number.

In embodiments, the information in the sync message may include a network branch number, a network depth number, a sending device up channel number, and a network sync time.

In embodiments, the response message time is a sync sub-channel time of the sender of the sync message.

In embodiments, determining the parent EMG time may include using the network branch number, the network depth number the sending device up channel number and the network sync time to determine a down channel of the parent; and using the down channel of the parent to determine the parent EMG time.

In embodiments, the sub-channel taken response time is a down channel available sub-channel time.

In embodiments, the sub-channel taken response is the a sending device up channel number and the available sub-channel number.

In embodiments, the device checks that the sync message is valid.

In embodiments, a non-transitory machine-readable medium is disclosed, the medium encoded with a distributed computer program having instructions to be performed by a device, the non-transitory machine-readable medium including instructions for receiving, via a communications interface, a sync message that comprises a sub-channel number;

instructions for determining a parent EMG time using information in the sync message; instructions for sleeping; instructions for waking at the parent EMG time; instructions for sending a request message at the parent EMG time, the request message including the sub-channel number; instructions for sleeping; instructions for waking at a response message time; instructions for receiving a response message including a yes/no indication, and an available sub-channel number; and instructions for the device assigning itself to a sender of the sync message when the yes/no indication is a yes.

Various embodiments described herein relate to a method, device, and non-transitory machine-readable medium for a low-power mesh network including one or more of the following: a memory; a processor; a up-channel node mesh tree with N children on each node with a height of H numbered in depth-first pre-ordering; a down channel node mesh tree with N children on each node with a height of H numbered in depth-first post-ordering; and a communications channel comprising a channel for each of the nodes in the up-channel node mesh tree, followed by a channel for each of the nodes in the down-channel mesh tree, wherein the communications channel cycles.

Various embodiments are described that additionally include the channel for each of the nodes in the up-channel node mesh tree further including sub channels for each of the nodes in the in the up-channel mesh tree and a SYNC sub channel.

Various embodiments are described that at least one down channel and at least one up channel includes N+1 sub channels.

Various embodiments are described where the up channel include a SYNC sub channel and N sub channels.

Various embodiments are described where the down channel comprises an EMG sub channel and N sub channels.

Various embodiments are described where at least one up channel is followed by a channel spacing.

Various embodiments are described that at least one down channel is followed by ½ the channel spacing.

Various embodiments are described where an synchronized node sends a sync message, receives a message at the synchronized nodes listening time from an unassigned node requesting to be made a child node, and in response, sends a request to the synchronized node's parent. The synchronized node receives a response from the synchronized node parent indicating if the unsynchronized node can be a child of the synchronized node. The synchronized node then sends the answer to the previously unassigned node.

Various embodiments are described where a when an unsynchronized node is accepted into the synchronized mesh as belonging to a sub channel, a message indicating the sub channel taken is sent down through each parent to the root node.

BRIEF DESCRIPTION OF THE FIGURES

In order to better understand various example embodiments, reference is made to the accompanying drawings, wherein:

FIG. 20 illustrates an example of a method for determining a sub channel timing using information found in a sync message;

FIG. 21a illustrates an example of a method for constructing an up channel communication channel from information found in a sync message;

FIG. 27 discloses an embodiment of a sub-channel taken response;

FIG. 28 discloses an embodiment of a sync message.

DETAILED DESCRIPTION

Figure 1:
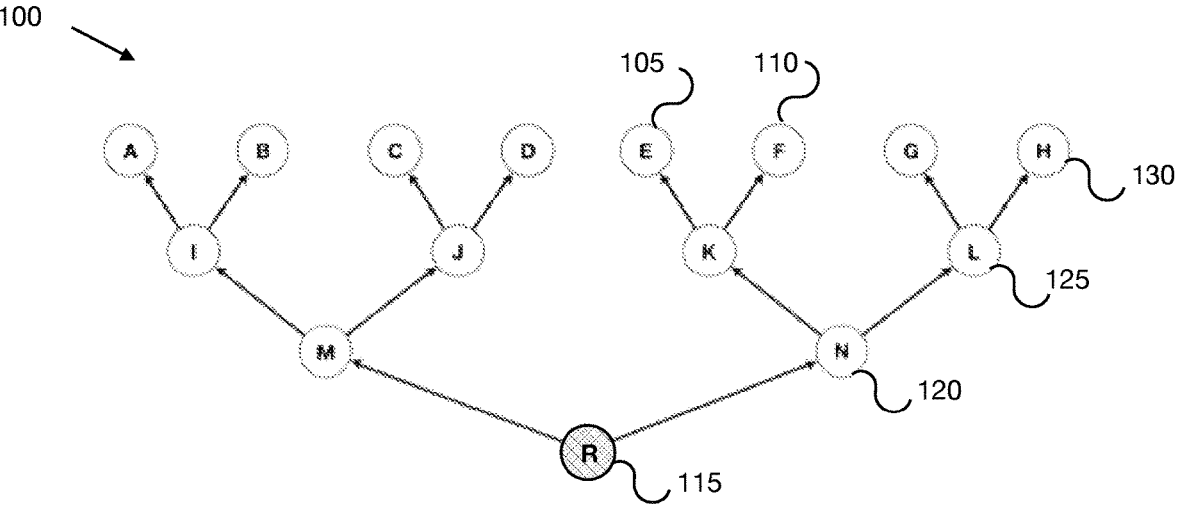
FIG. 1 illustrates an example of network mesh tree.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or" refers to a non-exclusive "or", unless otherwise indicated (e.g., "or else" or "or in the alternative"). Additionally, the various embodiments described herein are not necessarily mutually exclusive and may be combined to produce additional embodiments that incorporate the principles described herein.

Individual battery operated devices generally have limited ranges to their wireless communication methods. IOT devices can improve range and scalability by being entirely wireless—in some implementations necessitating a battery. Range and scalability may be further improved when the devices can self organize into a mesh network. This may also increase the range, as large areas can be populated by individual devices, each with its own range, with little setup or maintenance.

Typical mesh networking can be extremely power-draining for battery operated devices. In many applications, devices need to be ready to receive a message from their peers and retransmit it to other peers. Leaving the device radio on and listening for messages can drain a small battery in less than a single day. Synchronized mesh networks can solve this problem. They allow devices to operate on a strict schedule so that a device can listen for just the moment in time that a message is sent to it. Such a device may also only send a message during the brief period its peer is listening.

Synchronized mesh networks are not without scaling difficulties, however, as most devices which might be used to setup a network do not have sufficiently precise timing abilities to configure the synchronizing clock on each device. Also, the configuring device may not know ahead of time where each device might be, or even how many devices there will be. This makes it very difficult to produce a schedule with the required hand-off to each device unless each device is visited multiple times. For example, accidentally assigning two devices to a similar schedule could produce wireless packet collisions, making devices speak over one another, effectively making both of their communications unintelligible.

A mesh network of battery-powered devices should takes steps to reduce radio-listening time and number of radio transmissions to prolong battery life. Devices can be synchronized and schedule each communication transaction ahead of time so that the minimum radio-on-time can be achieved. Various embodiments described herein automatically synchronize each device after commissioning. A schedule may be provided for communication for each device to speak and listen to its parent device and a schedule for communication for its eventual child/dependent devices. In various embodiments, a device only needs to receive a single short message to: get synchronized, know when to listen to parent, know when to talk to parent, when to listen to children, and when to talk to children. Once a device is synchronized, it will also begin synchronizing other devices. Disclosures herein permit large mesh networks including battery operated devices which may need to save energy.

Various embodiments disclosed herein provide methods for the set up of large mesh networks including small battery operated devices with little information about the layout of the network. This may include two upper bounds on size—the maximum number of devices deep or height H of the network and the number of children for any device N. This structure may provide some guarantees: the network will automatically synchronize each reachable device, it will provide each device with scheduled times for communication, each synchronized device can be reached by a central organizing device and respond in a constant amount of time, no device will speak over another, only the reception of a single short message is required for a device to become synchronized.

As a brief overview of the disclosures herein, the network may allow for a tree where each device has N immediate child devices (the network branch number), and the network is H devices deep, not including the root (the network depth number). FIG. 1 discloses a tree 100 where N=2 (each non-terminal device has two children, e.g., 105, 110) and H=3 (the graph is three devices high 120, 125, 130, not counting the root 115). As described later, knowing N and H allows a device to determine the time to perform four key events: 1) talk to its children and sync them, 2) listen to its children, 3) get resynchronized by its parent and listen to it, and 4) speak to its parent. As will be described in greater detail below, the communication tree may be flattened out into a timeline communication channel which repeats itself once it is finished, cycling at a regular rate. This regular rate may be the whole communication channel time to cycle, the communication channel time with a delay, etc. A benefit of such an ordering is that as devices know what time they are to speak and listen, they may be quiescent between such actions, saving energy. Another benefit of such an ordering is that devices will not interfere with each other's communications. The ordering of the four key events is designed to reduce the number of times which each device's radio must be activated; It also groups like actions into blocks also reducing energy use. For example, a device may have each of its communications to its children scheduled one after the other in a single block. It may be that during this block a single synchronization message is sent for each child to receive; each device in range which has yet to be synchronized may also listen for this synchronization message, allowing devices to enroll without specifying a unique enrollment message. Other benefits will be obvious with regards to the disclosure as a whole.

Figure 2:
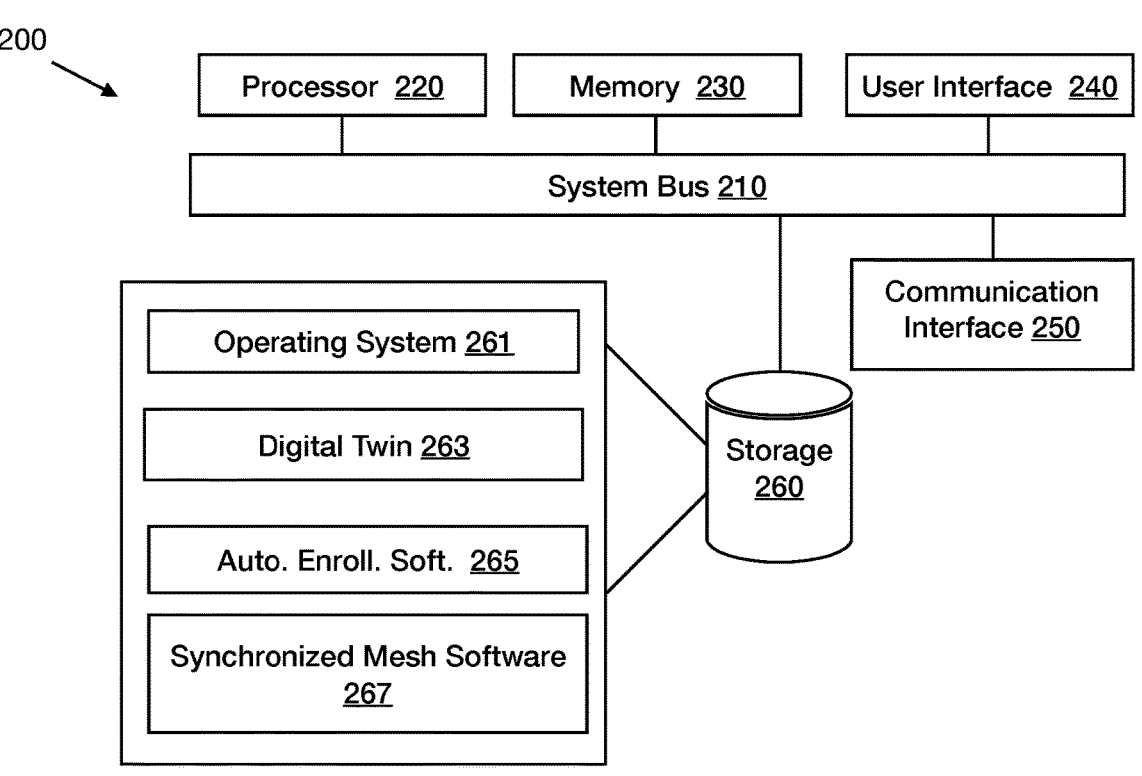
FIG. 2 illustrates an example hardware diagram for implementing a controller/hardware device.

FIG. 2 illustrates an example hardware diagram 200 for implementing a sensor device. As shown, the device 200 includes a processor 220, memory 230, user interface 240, communication interface 250, and storage 260 interconnected via one or more system buses 210. It will be understood that FIG. 2 constitutes, in some respects, an abstraction and that the actual organization of the components of the device 200 may be more complex than illustrated.

The processor 220 may be any hardware device capable of executing instructions stored in memory 230 or storage 260 or otherwise processing data. As such, the processor may include a microprocessor, field programmable gate array (FPGA), application-specific integrated circuit (ASIC), a vector processor, or other similar devices. In a multi-processing system, multiple processing units execute machine-executable instructions to increase processing power and as such multiple processors, as well as multiple elements with a processor, can be running simultaneously. It should be apparent, however, that in various embodiments elements belonging to the processor 220 may not be physically co-resident. For example, multiple processors may be attached to boards that are physically separate from each other.

The memory 230 may include various memories such as, for example L1, L2, or L3 cache or system memory. As such, the memory 230 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 240 may include one or more devices for enabling communication with a user such as an administrator. For example, the user interface 240 may include a display, a mouse, and a keyboard for receiving user commands. In some embodiments, the user interface 240 may include a command line interface or graphical user interface that may be presented to a remote terminal via the communication interface 250.

The communication interface 250 may include one or more devices for enabling communication with other hardware devices. For example, the communication interface 250 may include a network interface card (NIC) configured to communicate according to the Ethernet protocol. The communication interface 250 may include a bluetooth transmitter, receiver, antenna and specialized control chips. Additionally, the communication interface 250 may implement a TCP/IP stack for communication according to the TCP/IP protocols. The communication interface may also include various alternative or additional hardware or configurations for the communication interface 250 as will be apparent.

The storage 260 may include one or more machine-readable storage media such as read-only memory (ROM), random-access memory (RAM), magnetic disk storage media, optical storage media, flash-memory devices, or similar storage media. In various embodiments, the storage 260 may store instructions for execution by the processor 220 or data upon with the processor 220 may operate. For example, the storage 260 may store a base operating system 261 for controlling various basic operations of the hardware 200. The storage 260 may also store a digital twin 263 with the software necessary to describe and run it. Also included in storage 260 may be auto-enrollment software 265 as described in greater detail with reference, e.t., to FIGS. 18, FIGS. 20, 21a, 21b, and 22 to 24 and the surrounding text. Synchronized mesh software 267 (more fully described with reference to FIGS. 1-6 and the surrounding text) that allows auto-enrollment may also be stored within storage 260 or elsewhere.

It will be apparent that various information described as stored in the storage 260 may be additionally or alternatively stored in the memory 230. In this respect, the memory 230 may also be considered to constitute a "storage device" and the storage 260 may be considered a "memory." Various other arrangements will be apparent. Further, the memory 230 and storage 260 may both be considered to be "non-transitory machine-readable media." As used herein, the term "non-transitory" will be understood to exclude transitory signals but to include all forms of storage, including both volatile and non-volatile memories.

While the host device 200 is shown as including one of each described component, the various components may be duplicated in various embodiments. For example, the processor 220 may include multiple microprocessors that are configured to independently execute the methods described herein or are configured to perform steps or subroutines of the methods described herein such that the multiple processors cooperate to achieve the functionality described herein. Further, where the device 200 is implemented in a cloud computing system, the various hardware components may belong to separate physical systems. For example, the processor 220 may include a first processor in a first server and a second processor in a second server.

Figure 3:
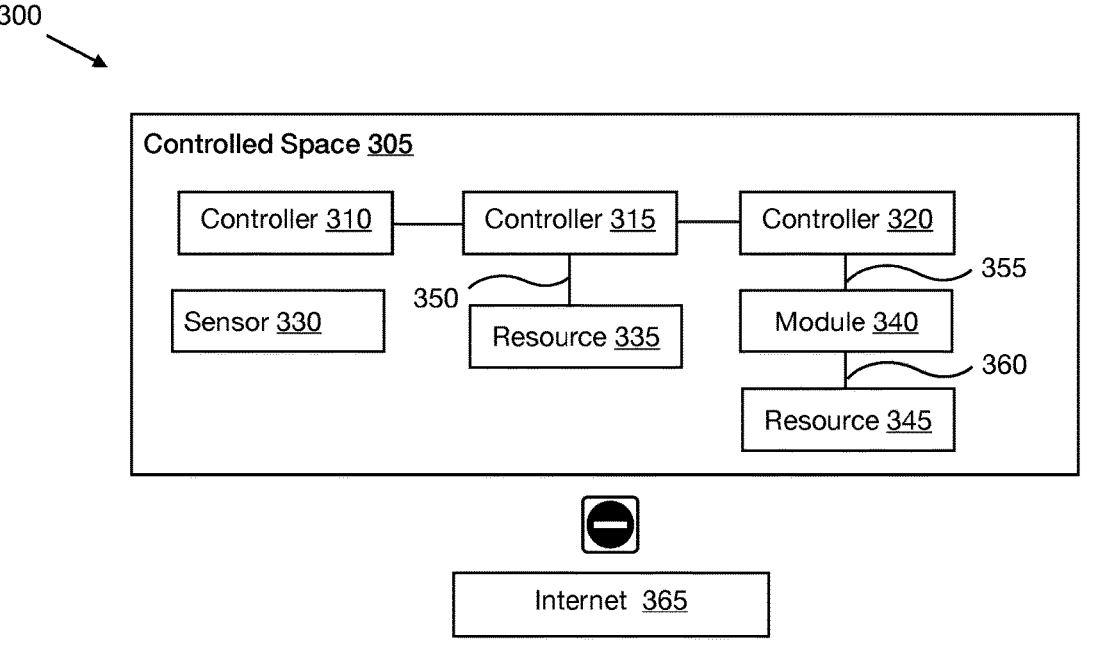
FIG. 3 illustrates an example of a distributed computing system.

FIG. 3 illustrates an example of a distributed computing system 300 that may be used in implementations described herein. A controlled space 305 may have multiple controllers (e.g., 310, 315, 320) within the space. Each of these controllers may contain some or all of the controller/hardware system shown with reference to FIG. 2 at 200. In some embodiments, the distributed computing system may run without access to the Internet 365. In some embodiments, the distributed computing system may be run as an edge computing system with one or more edge devices that allow selective connections to the internet through them. In some embodiments, the distributed computing system allows applications (e.g., software) to run on multiple controllers (e.g., some combination of 310, 315, 320) simultaneously or serially, or a combination of both. The same application may run in concurrent processes on different processors, on different controllers, etc., such that users perceive the controllers as an integrated whole. This may provide redundancy, as when components fail, other components can seamlessly take over their roles. These distributed applications may be stored and run completely within the controlled space 305 without access to external Internet 365. This may allow low latency, as e.g., processing time is not affected by cloud/Internet lag time. In some embodiments, one or more controllers 310, 315, 320 may connect to the Internet 365. The connection may be siloed off from the bulk of the computing power in the controlled space 305.

The distributed computing system 300 may run as a client-server system with one controller being designated as the leader-follower. The distributed system may be run as a peer-to-peer network, a virtual server may be used, etc. The application may be split into a number of pieces, e.g., chunked, between the controllers. The controllers may be self-federating; e.g., they self-assemble into a network. Controllers may vote to elect a leader. If the network is damaged, such that the current leader can no longer lead, a new leader may be elected by at least some of the undamaged controllers. This provides built-in redundancy. The leader controller may determine how to divide the work load among the controllers.

The controller may have one or more connectors that connect 350 to a resource 335 and additional resources (not shown). The controller may have connectors that connect to one or more modules 340 through module connectors 355. Such modules 340 may have resource connectors 360, that are directly wired to one or more resources 345. The resources 335, 345 may be any sort of resource that can be wired to a controller. For example, without limitation, resources may be HVAC resources, such as heating, cooling, and storing resources, entertainment resources, such as sound systems and TV's, lighting resources, safety resources, such as door locks, etc. The controller 320 may control a resource 345 though the resource connectors 360 communicating to the module connectors 355, and vice-versa.

These arrangements may allow the controllers 310, 315, 320 to control the resource, such as turning a heater on, through the module connector 355 passing information through the module 340 through the module connectors 355.

The message is then passed through resource connectors 360 to the resource 345, such as, e.g., telling a heater to turn on. A resource 335 may be wired through one or more resource connectors 350 directly to a controller 315. In some embodiments, a resource may be wired to one or more modules 340. In some embodiments, a controller may not control a specific resource but infers its state from sensors, the state of other resources, and so forth.

Figure 4:
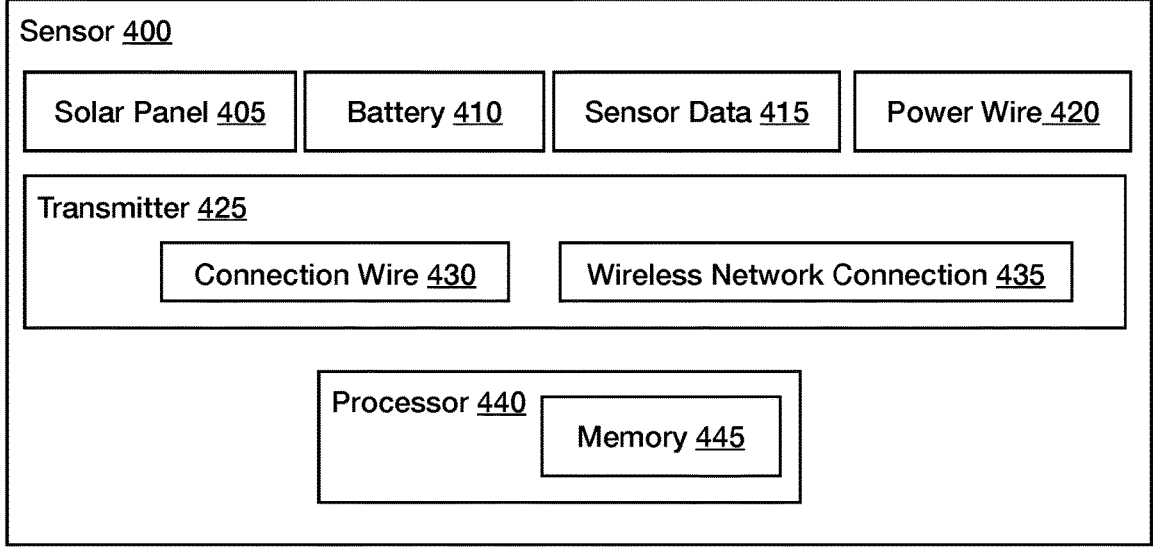
FIG. 4 illustrates a device example.

FIG. 4 illustrates a device example 400 that may be used with embodiments described herein. The device example 400 may be a sensor 330 such as shown with reference to FIG. 3, or a different sort of device. With reference to FIG. 4, a device is shown that may be used, in whole, or in part, in any of the embodiments disclosed herein. The device 400 may be part of a building control system that determines the comfort level of a building, or a different sort of control system. This device may include a solar panel 405, a battery 410, and sensor component 415. The device may have a power wire 420, which may deliver power from the solar panel, or may use both. The solar panel 405 may have an unwired light specification of 50 Lux at 8 hours, 40 Lux at 8 hours, 25 Lux at 8 hours, or a different specification. The battery autonomy may be 1 year with no light, 2 years with no light, or a different amount.

The sensor component 415 may be one or more devices configured to sense data to be shared with other devices. The type of data sensed will typically be suited to the application of the system in which the sensor device 400 participates. For example, where the sensor device 400 is used in an HVAC control system, the sensor component 415 may include a temperature sensor, a humidity sensor, a barometric pressure sensor, or other appropriate sensors. Other embodiments of the sensor component might include, for example, a light sensor, an infrared sensor, a sound sensor, a proximity sensor, an RFID sensor, a moisture sensor, a current sensor, a voltage sensor, or virtually any other component that could generate sensor data to be reported. The sensor data may be stored, may be sent to a different device, etc. The sensor data may be stored in memory associated with the sensor component 415, in the memory 445, or elsewhere. This memory may be flash memory, or a different sort of suitable memory. There may be a processor 440 on board the sensor device 400 which can make certain decisions, such as actions necessary to auto-enroll into a network mesh. The processor 440 may make calculations, such as determining energy data, determining network device configurations, determining messaging time, and so on. The processor 440 may be a microprocessor, field programable gate array (FGPA), application specific integrated circuit (ASIC), or any other device capable of performing the logic functions described herein. The processor 440 may have high-efficiency signal processing, low power, low cost, or may have other features. The CPU processor may include memory 445. The memory may also include auto-enrollment software that allows the sensor device to auto-enroll in a synchronized mesh. Also included may be synchronized mesh software that allows the sensor device to understand the nature of the synchronized mesh that the sensor device will enroll into. A communications interface, (described more generally with reference to FIG. 30) that uses a communications interface (described more generally with reference to FIG. 28) may also be included. An example of a communications interface may be a transmitter 425, which may allow the sensor device to send sensor data to another entity, such as a controller e.g., 310, 315, 320, another sensor device, or a different entity. The transmitter may be wired 430, wireless 435, some combination, etc. The transmitter 425 may include a bluetooth mesh, a 2-wire multidrop, a 3-wire multidrop, or some combination of the above. The sensor device 400 may be able to monitor battery usage, battery power, etc., and report the battery information to a different entity such as a controller 310, 315, 320, a sensor 330, a resource 345, etc.

Figure 5:
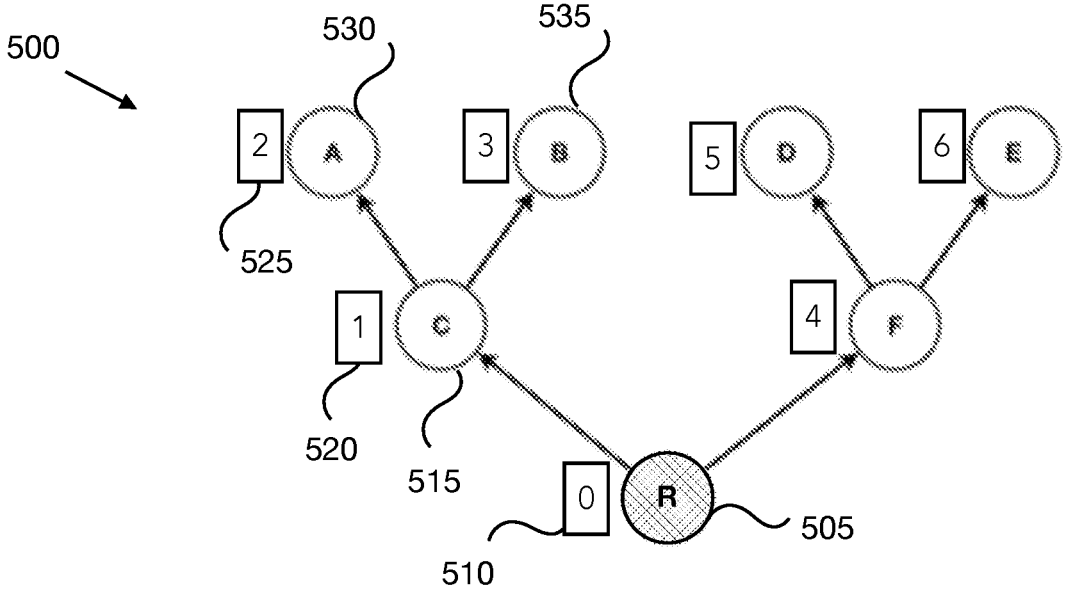
FIG. 5 illustrates an example of communication device tree with a possible up-channel ordering.

FIG. 5 illustrates an example of communication device tree 500 with one possible up-channel ordering-depth first pre-ordering. This device has a network branch number (N) of 2 and a network depth number—root device (H) of 2. In an example embodiment, the root device 505 (e.g., a device that may have a wired connection to a server, processor, controller, etc.) is allocated the first (0th) 510 up-channel. The next left-most device C 515 is allocated the next (1st) up channel 520. Moving up the leftmost edge, device A 530 is allocated the next up-channel 2 525. The next-leftmost child B 535 is given the 3rd up channel, and so forth. In some embodiments, devices with fewer devices between it and the root are assigned a lower up-channel. In some embodiments a depth-first search is used to number the up-channel devices. In a depth-first search the furthest left devices are traversed as far as possible, then the devices adjacent to the furthest left devices are traversed. Then, the algorithm backtracks until it finds more adjacent devices to explore. Devices which are further to the left in the diagram are assigned a lower up-channel, then the adjacent devices are assigned subsequent up-channels. This is also referred to as depth-first pre-ordering. As the channels are listed in order, and devices closest to the root may have lower channel numbers; a message may travel from the root to any device in a single up-channel group or less. In some embodiments, another ordering, such as a depth-first post ordering or a breadth-first search ordering may be used.

Figure 6:
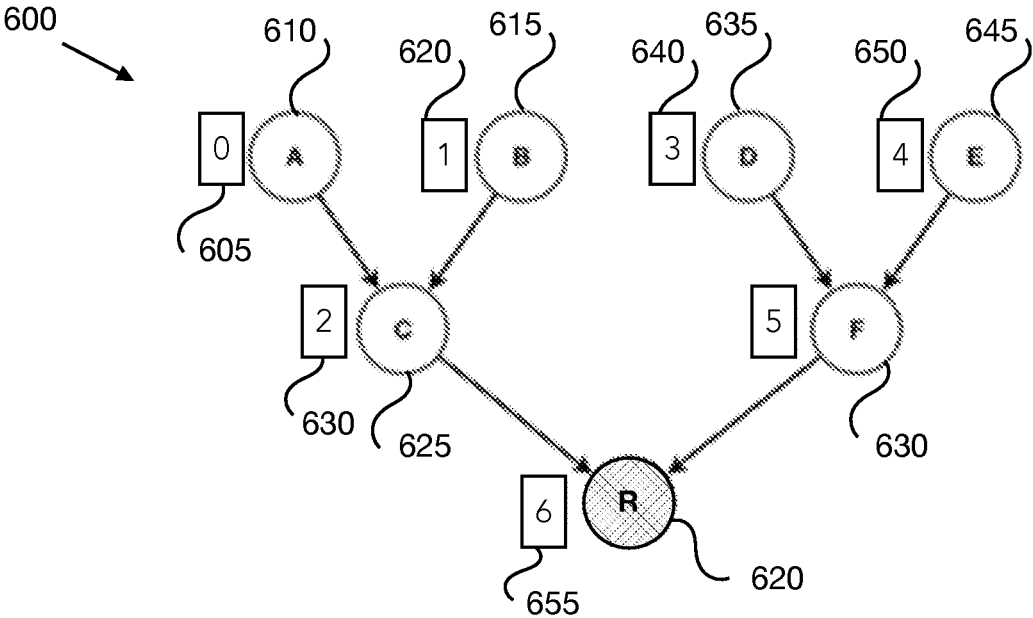
FIG. 6 illustrates an example of communication device tree with a possible down-channel ordering.

FIG. 6 illustrates an example of communication device tree 600 with one possible down-channel ordering. This, like the device structure of FIG. 5, has an N of 2 and an H of 2. In an example embodiment, the down-channel ordering is a depth-first post-ordering, though other orderings are also considered within the scope of this disclosure. In a depth-first post-ordering, the furthest left device A 610 is allocated the first (0th) 605 up-channel. The adjacent device B 615 is given next channel 1 620. The current device's parent C 625 receives the next channel down-channel 2 630. From C 625, it's adjacent device F's 630 child D 635 is next numbered as down-channel 3 640, followed by D's sibling E 645 (down-channel 4 650), and so on. Generally, the root device R 620 is allocated as the last down-channel, in this case 6 655. Because of this channel ordering, in some embodiments, all devices' messages can reach the root in a single down-channel group. In some embodiments, another ordering, such as depth-first pre-ordering or a breadth-first search ordering may be used.

Figure 7:
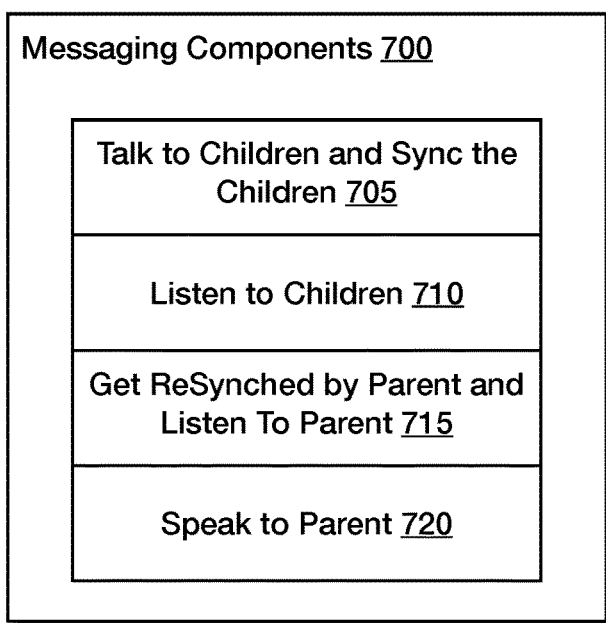
FIG. 7 illustrates an example of key events within messaging components that may be used to effectively received and transmit messages.

FIG. 7 illustrates an example of key events within messaging components 700 that may be used to effectively receive and transmit messages in embodiments described herein. These events may be for a device, such as the sensor device illustrated in FIG. 4. The key events for a device as illustrated are: 1) talk to children and sync them 705; 2) listen to children 710; 3) be resynchronized by your parent and listen to the parent 715; and 4) speak to the parent 720. These four key events may be ordered to reduce the number of times that each device's radio may be activated. As a preview, communication devices may be scheduled to listen to each of their children one after the other (or in a different order) in a single reception block. This reception block may allocate a section of time for unsynchronized devices to request to be the communication device's child. There are two time blocks for each device: up channels and down channels respectively. In the up channels, in one action a device listens for messages from its parent and is resynchronized by its parent 715, and in another action talks to its children and resynchronizes the children 705. In the down channel, in one action a device listens to its children 710, and in another talks to its parent 720.

The channels are divided into slices of time known as sub-channels. Thus, the channels may be time-division multiplexed. More information about communications channels may be found with reference to FIGS. 29, 30, and 31 and the surrounding text. The sub-channels are dedicated to be used for synchronization messages, child messages, and unknown device messages. If a device has a number of child devices less than the N devices allocated for it, it will only participate during the sub-channels for the present devices, thereby saving power. A device participates in its up and down channels, as well as its parent's up and down channels if it is not a root device. A root device may be a wired device in which IOT and other device information goes for use in some central program or is used in some other way. In some embodiments, the up and down channel allocated to each device in the tree is selected such that the root device can request information from any device and get a response in only one up/down cycle, and any device in the tree can report data to the root device in one down channel group. This feature may reduce latency of communication in the network without having to increase the frequency of communication. It also provides a guaranteed timeframe in which the root should receive a request from a response. In some embodiments, each up channel number is unique per device.

In various embodiments, the root device is allocated the first (0th) up channel. Devices with fewer devices between it and the root are assigned a lower up channel. Devices which are further to the left in the diagram are assigned a lower up channel. This is also referred to as depth-first pre-ordering. Because the channels go in order, and devices closest to the root have lower up channel numbers and therefore have earlier slices in the multiplexed channel, a message can travel from the root to any device in a single up-channel group or less.

In some embodiments, the root device is allocated the last down channel. In embodiments, devices, as they get further from the root, receive lower down channel numbers. In embodiments, devices which are to the left in the diagram are assigned a lower down channel. This is also referred to as depth-first post-ordering. Because of this channel ordering, in some embodiments, all devices' messages can reach the root in a single down-channel group or less. Disclosures of how to do so will be explained below.

Figures 8, 9:
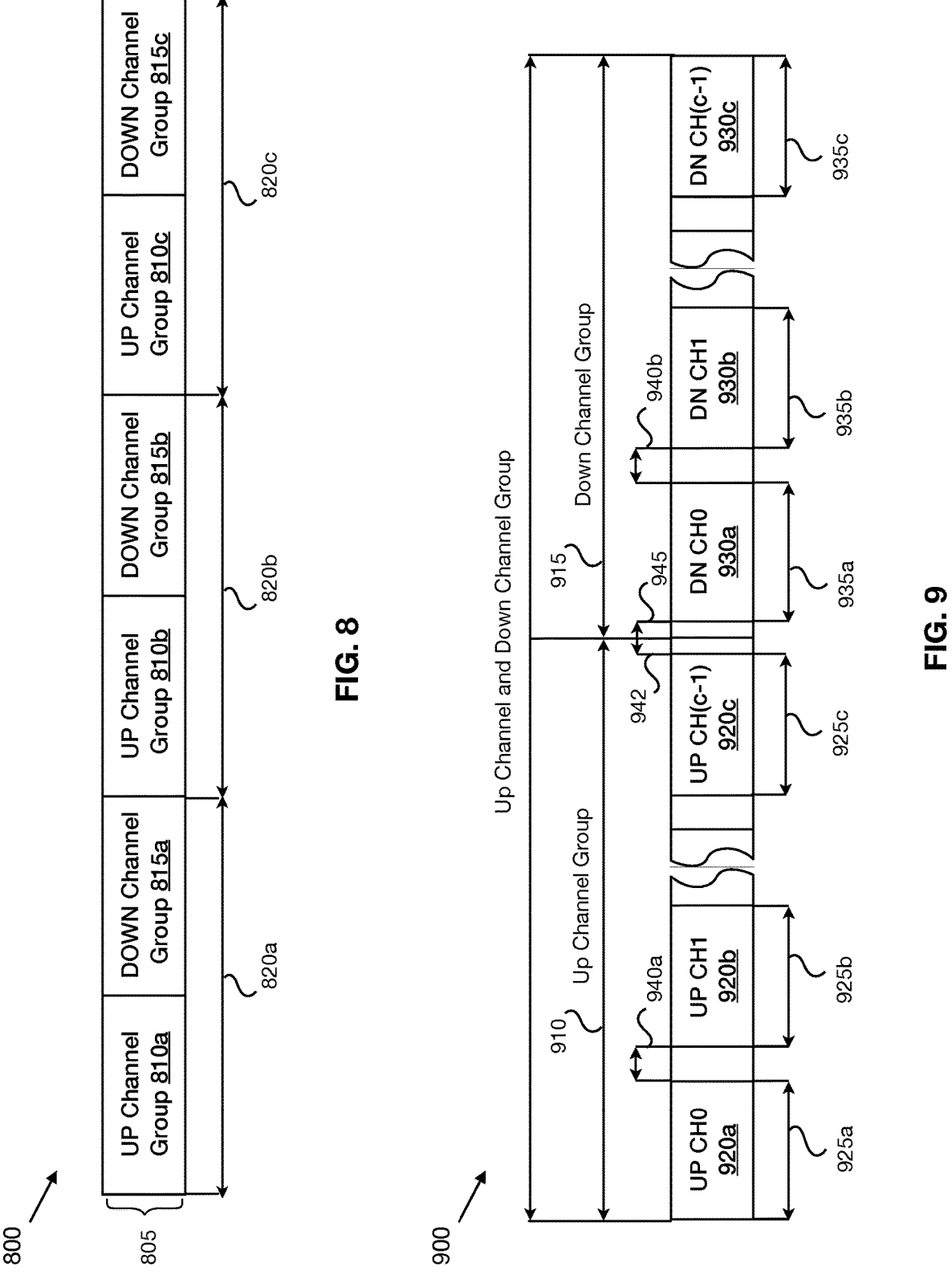
FIG. 8 illustrates an example of a series of up-channel-group down-channel-group cycles.
FIG. 9 illustrates an example of the composition of an up channel group and a down channel group.

FIG. 8 illustrates an example, in some embodiments, of the composition of a communication channel 800 that may be used for automatic enrollment of devices into a synchronized mesh network. Some communication channels that may be used with embodiments disclosed herein are described with reference to FIGS. 29, 30, and 31. Up channel groups 810a, 810b, 810c may precede down channel groups 815a, 815b, 815c, creating up and down channel groups 820a, 820b, 820c. Devices may have communications to its children scheduled in some order, such as sequentially, reverse sequentially, staggered, or a different order, in a single up channel group 810. Each device may have communications from its children scheduled in some order, such as sequentially in a single down channel group 815 that may directly follow an up channel group, e.g., 810a. In some Embodiments, the down channel Group 815a may be first, followed by an up channel group 810a. These up channel and down channel Groups 820a, 820b, 820c may repeat sequentially, as shown.

FIG. 9 illustrates an example of an up channel and down channel group 900. This includes, in some embodiments, up channels (e.g., 920a, 920b, 920c) that make up an up channel group 910 and down channels (e.g. 930a, 930b, 930c) that make up a down channel group 915, both together which make up an up channel and down channel group 900. There are as many up channels and down channels as there are communication devices. The number of up channels (which may also be the number of down channels) may be referred to as the channel count—C. In some embodiments, the channel numbering reflects the channel to which it refers. The channel count may be able to be determined by N (potential children of each device)) and H (height of devices not including the root device) values using the following equation: If N=1, then $C=N \times (H+1)$, else $C=(N^{(H+1)} - \div (N-1))$. For example, the communication device up tree shown in FIG. 5 would be represented by 7 up channels. Similarly, in the communication device down tree shown in FIG. 6 there would be 7 down channels.

In some embodiments, each up channel 920a, 920b, 920c is followed by a channel spacing 940a. In some embodiments, the channel spacing 940a, 940b is understood by the network, and may be a network variable that is not transmitted separately; in some embodiments, the channel spacing is variable and depends on the specific channel. Down channels 930a, 930b, 930c may be followed by the same duration 940b, or a different duration. Up channel duration 925a, 925b, 925c and Down channel duration 935a, 935b, 935c may be the same duration, or may be a different duration. In some embodiments, an up channel spacing 942 (which may be the duration of a half up channel spacing 940a or a different duration), may be at the beginning, the end, or both, of an up channel group 910. In some embodiments, a down channel spacing 945 (which may be the duration of half of a down channel spacing 940b or a different duration) may be at the beginning, the end, or both, of the down channels group 915. The up channels may run sequentially, e.g., up channel 0, up channel 1, all the way through up channel C-1 (where C is the number of channels); the up channels may begin with up channel C-1 (the last channel) at the beginning of an up channel group 910 or a down channel group 915; the channels may be staggered, such as all the even numbered channels followed by the odd-numbered channels, or may use a different method of sorting the channels. This device mesh and channel construction may have the effect that the network mesh trees (e.g., as shown in FIGS. 5 and 6) may be flattened out into a time line which repeats once it is finished, cycling at a regular rate. This may allow a device to determine the mesh tree layout and the sync and emg times for a given child. This may allow the device to know the time to talk to a potential parent by only knowing a few parameters. This is discussed with more detail with reference to FIG. 28 and the surrounding text. It may have the further benefit that no devices may interfere with another's communications, as each device has its own slices of time within the communication channel for listening and speaking. Devices may also have each communications scheduled one after another in a single block, as shown with reference to FIGS. 12-17b and the surrounding text.

Figure 10:
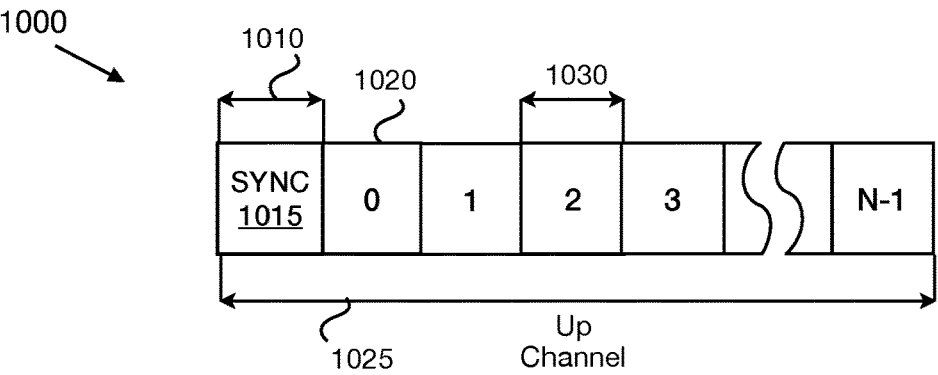
FIG. 10 illustrates an example of a sub-channel configuration within an up channel.

FIG. 10 illustrates an example, in some embodiments, of a sub-channel configuration within an up channel 1000. Up channels 920, 1025 are themselves composed of some number of sub-channels 1020. In some embodiments, the sub-channel duration is a constant that can be determined without being physically sent in a message. In some embodiments, the sub-channel duration may be specified in a message, such as a message sync message, such as shown with relation to FIG. 28 at 2830. An illustrative embodiment discloses that the number of up sub-channels is the number of child devices for each device (N) and an extra block, a Sync block 1015. In the illustrated embodiment, the sub channels for communication with the child devices are numbered starting a 0 and ending at N−1. The up channel device tree disclosed in FIG. 5 would have 3 sub-channels, as N=2. In some embodiments, every possible device may not have a communication channel associated with it. In such instances, the sub-channel blocks are not all allocated, but still exist. This allows devices that have yet to be added to the mesh to find one of these available blocks and add itself as a child to the mesh, and in so doing, allocate for itself a set of unallocated channels that belong to this child. This is more fully explained later. FIGS. 12 through 17*a* and the surrounding text illustrate, e.g., block placement. Some implementations may have a different number of sub-channels. In the illustrative example, the Sync block 1015 is placed at the beginning of the sub-channel block. Other implementations may place the Sync block 1015 at the end, or somewhere in the middle. The Sync sub-channel may be used to send messages. These messages may include sync messages (described more fully with reference to FIG. 28), sub-channel request response messages (described more fully with reference to FIG. 26) and other messages that may be used within a synchronized mesh network. Devices knowing the time of the Sync sub-channel may listen at the appropriate time to receive the Sync message.

Figure 11:
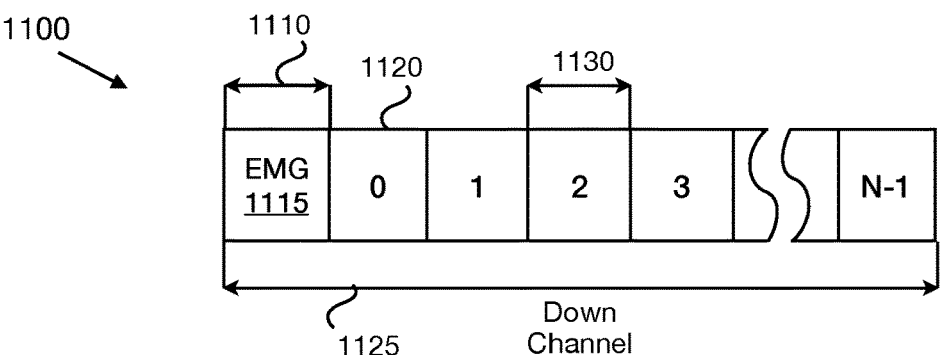
FIG. 11 illustrates an example of a sub-channel configuration within a down channel.

FIG. 11 illustrates an example, in some embodiments, of a sub-channel configuration within a down channel 1100. Down channels 922, 1125 are themselves composed of some number of sub-channels 1120. The illustrative embodiment discloses that the number of sub-channels is equal to N+1, the number of children possible for each device plus one more, the EMG channel. In the illustrated embodiment, the sub channels for communication with the child devices are numbered starting a 0 and ending at N−1. The down channel device tree disclosed in FIG. 6 would have 3 sub-channels, two child channels, N+1, an EMG channel. In some embodiments, every possible device may not have a child, e.g., it may not have a communication channel allocated to it. In such instances, the sub-channel blocks are still allocated. This allows unsynchronized devices to allocate themselves to a set of these currently available channels, as will be described more fully with reference to FIG. 18. Some implementations may have a different number of sub-channels. In the illustrative example, the EMG block 1115 is placed at the beginning of the sub-channel block. Other implementations may place the EMG block 1115 at the end, or somewhere in the middle. In an illustrative embodiment, each sub-channel is the same duration 1110, 1120, 1130. In other embodiments, the EMG sub-channel 1115 may be a different duration than the other channels. The EMG sub-channel may be used to receive messages. These messages may include sub-channel request messages (described more fully with reference to FIG. 25), sub-channel taken response messages (described more fully with reference to FIG. 27) and other messages that may be used within a synchronized mesh network. Devices knowing the time of the EMG sub-channel may send messages to a device at the appropriate time.

Figure 12:
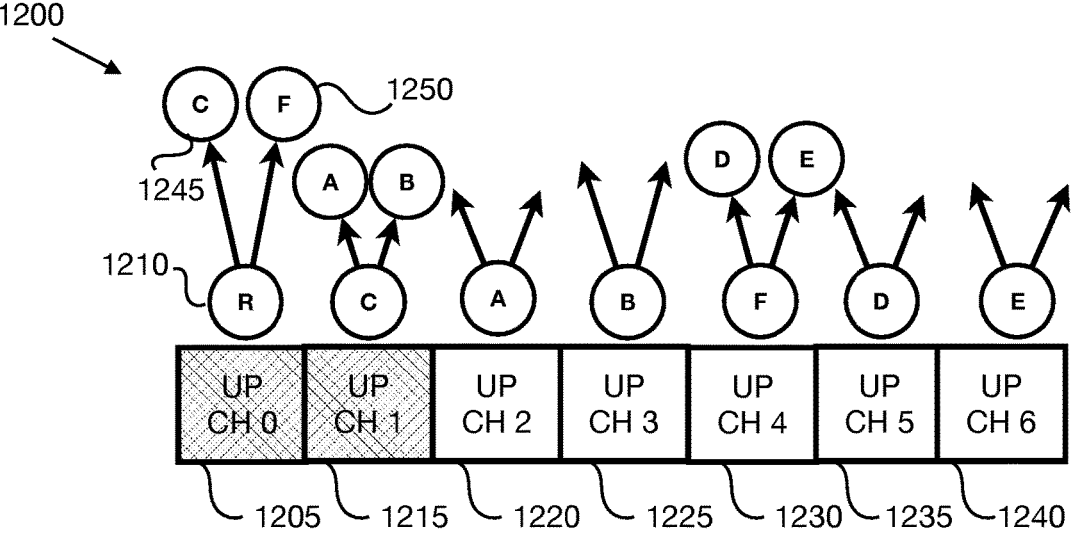
FIG. 12 illustrates an example of a row of up-channels in a timeline with a representation of each channel's occupying node and their children.

FIG. 12 illustrates an example implementation of an up channel for the mesh network 1200 shown with reference to FIG. 5. In up channels, a parent device (e.g., R in up channel 0 1205) talks to its children C 1245 and F 1250, and the children listen to the parent. This figure includes the up channels that correspond to each device in the mesh tree shown with reference to FIG. 5*e* In the illustrated embodiment, each device has its own up channel allocated. In the illustrated embodiment, the up channel numbering for each device is as shown in FIG. 5. Device R 505, 1210 has been assigned the up channel 0 1205. During the time set aside for up channel 0 1205, R 1210 synchronizes with and talks to its children C 1245 and F 1250 in dedicated sub-channels. In matching actions, still during up channel 0, devices C 1245 and F 1250 listen their parent R 1210. We see from FIG. 5 that C owns up channel 1. Therefore, in up channel 1 1215, C synchronizes with and talks to its children A and B, with A and B listening to C. Up channels 2 1220, 3 1225, 5 1235 and 6 1240 are for exclusively child devices A, B, D, and E and so have no actions associated with them, but the time is still allocated as new devices could be added of which they would be parents. Up channel 4 1230 is for device F, which has two children, D and E. D and E listen during this channel to their parent, F, and F talks to D and E.

Figure 13:
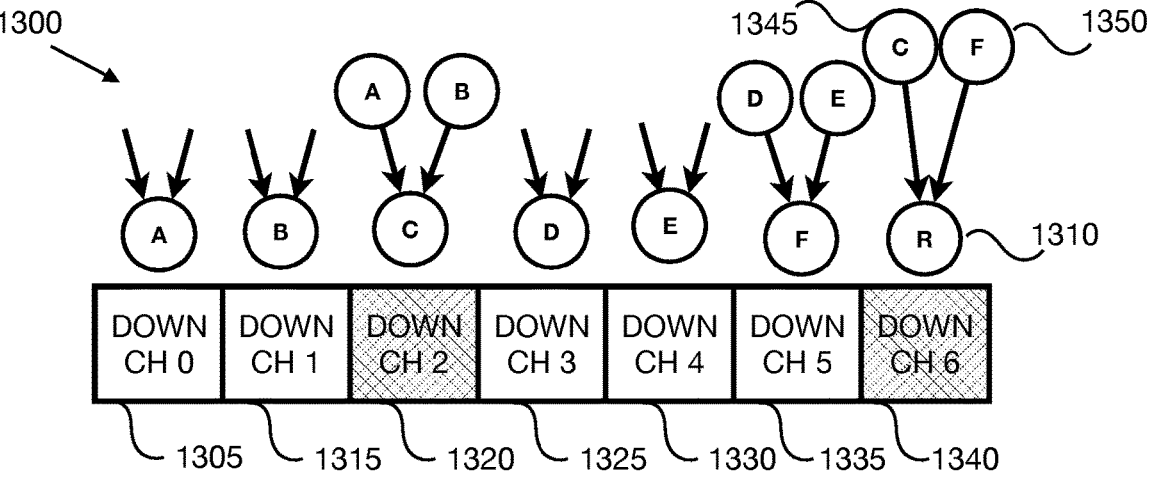
FIG. 13 illustrates an example of a row of down-channels in a timeline with a representation of each channel's occupying node and their children.

FIG. 13 illustrates an example implementation 1300 of a down channel for the mesh network shown with reference to FIG. 6. This figure includes both the down channels (e.g., DOWN CH 6 1340 references down channel 6), and the device the down channel references e.g., R 1310, along with the device's children, e.g., C 1345, F 1350. Each device has its own down channel time, even if the channel is available in a specific instance. FIG. 6 shows that for the down channels, R 620 has been assigned to down channel 6 655. During down channels, the parent device (e.g., R 1310) listens to its children (e.g., C 1345, F 1350) during dedicated sub-channels, and the children talk to the parent. In a matching action, C 1345 and F 1350 listen to their parent R 1310 during that same down channel in the dedicated sub-channels. We see from FIG. 6 that A owns down channel 0 1305 and has no children. Therefore, this channel 0 1305 is available, along with down channels 1 1315 for device B, down channel 3 1325 for device D, and down channel 4 1330 for device E, all of which have no children. If these devices have children added then the channels will be used. In down channel 2 1320, C listens to its children A and B, with A and B speaking to C. Down channel 5 1335 is for device F, which has two children, D and E. D and E speak during this channel to their parent, F, and F listens to D and E.

Figure 14:
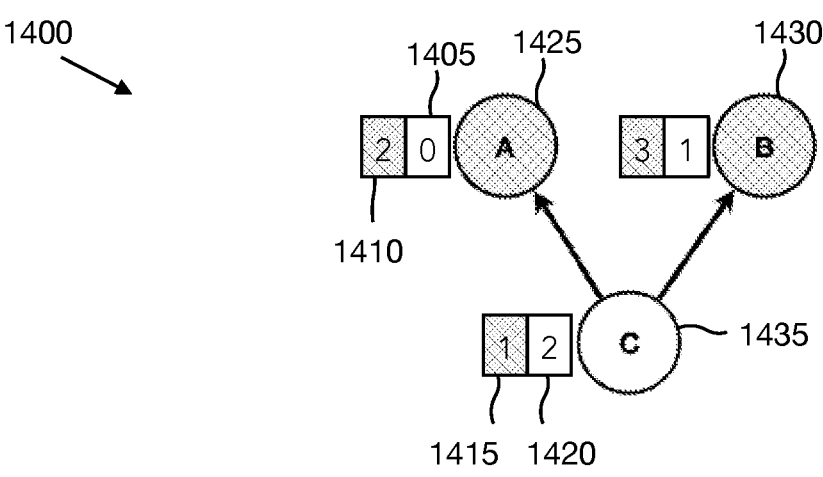
FIG. 14 illustrates an example of up and down channel numbering associated with a device.
Figure 15A:
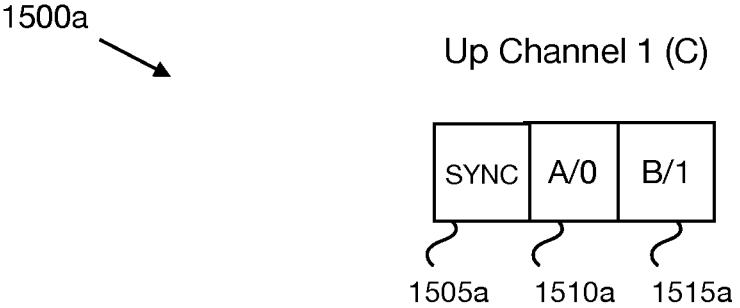
FIG. 15a illustrates an example of an up channel of the device described with reference to FIG. 14.

FIG. 14 discloses a channel numbering example 1400, illustrating a possible up- and down-channel numbering of Device C 1435 in the synchronized mesh network as described with reference to FIGS. 5 and 6. Both up and down channels have dedicated sub-channels where a device talks to each of its children. A's down channel is 0 1405, while its up channel is 2 1410. Device C's up and down channels is are 1 1415, and 2 1420. FIG. 15*a* shows the up sub-channels for C 1500*a*. The number of sub-channels for each device is 1+N (the number of possible children for each parent in the mesh). In this case, "N" is 2, so each up- and down-channel has three sub-channels. The up sub-channels that device C references are SYNC, which is the time that this device sends out a sync message (discussed with greater reference to FIGS. 18 and 28); then, in this instance, during sub-channel 0 1510*a* C sends out messages for device A. This is followed by sub-channel 1, in which C sends out messages to device B. In this embodiment, the sub-channels are filled from left to right, starting with sync, leading to SYNC, A, B. In some other embodiments, the sync channel may be in a different location, such as at the end, the middle, or somewhere else. In other embodiments, the sub-channels may be filled right to left, staggered, or in a different order. In the illustrative example children with no children of their own (e.g., A and B) would have, as an up channel, a sync sub-channel followed by two sub-channels that would be currently unused. These unfilled channels are times that devices seeking to auto-enroll can use, as each sub-channel can hold information for a child. C's up channel will be used for C to talk to its children, and for its children to listen. In up channel 1 1500a, C will sequentially sync 1505a its children A and B, then talk to child A in channel 0 1510a, followed by talking to B in channel 1 1515a. The children are aware of the time the parent talks, and so listen then.

Figure 15B:
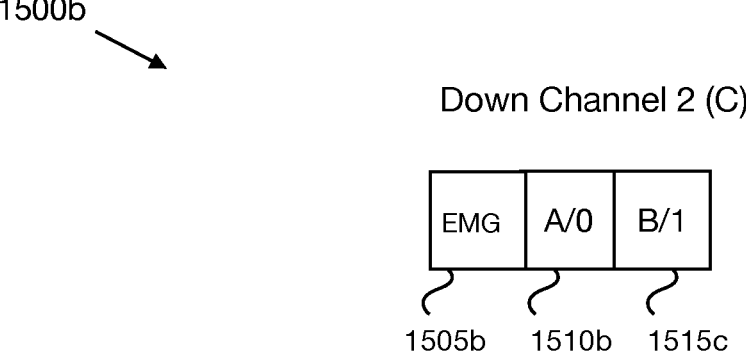
FIG. 15b illustrates an example of a down channel of the device described with reference to FIG. 14.

FIG. 15b shows an embodiment of the down sub-channels for C 1500b. In C's down-channel 2 1500b, C will listen to its children. During EMG Sub-Channel 1505b, C will listen if there are devices that need parents; in down channel 0 1510b, C will listen to A and A will talk to C, in down channel 1 1515c, C will listen to B and B will talk to C.

Figure 16:
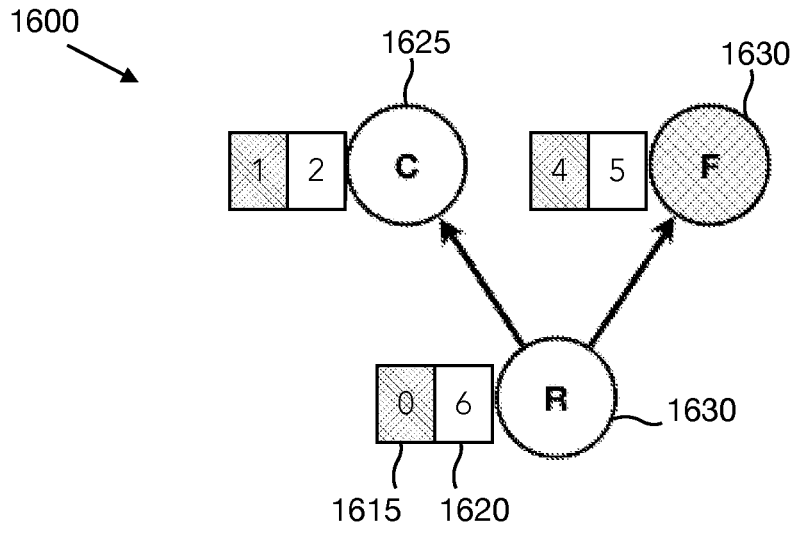
FIG. 16 illustrates an example of up and down channel numbering of three devices including the network root.
Figure 17A:
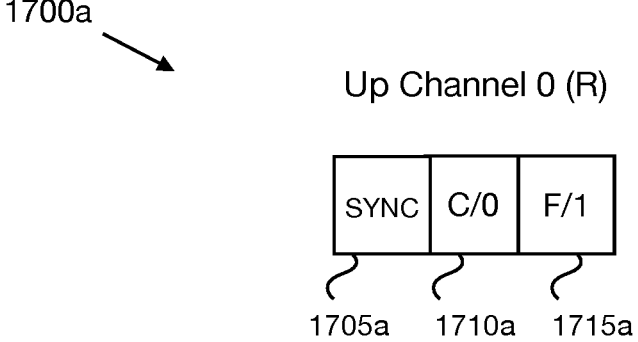
FIG. 17a illustrates an example of the up channel of the device described with reference to FIG. 16.
Figure 17B:
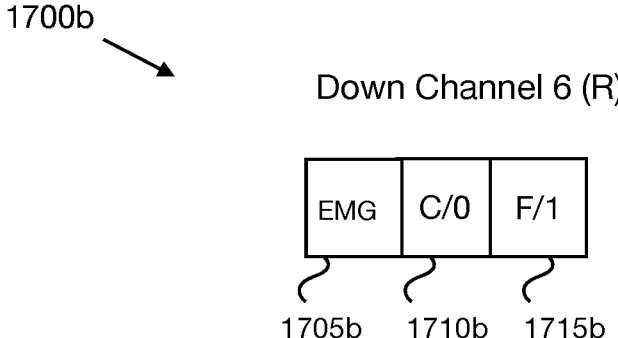
FIG. 17b illustrates an example of the down channel of the device described with reference to FIG. 16.

FIG. 16 at 1600 illustrates Device R 1630 (C's parent) and its children C 1625 and F 1630. Device R's 1630 up channel is 0 1615, while its down channel is 6 1620, with children C 1625 and F 1630. FIG. 17a at 1700a shows up channel 0 (as shown with reference to FIG. 5). In the example embodiment shown, during the first sub-channel 1705a R sends a SYNC message. R will then talk to device C in sub-channel 0 1710a and device F 1715a in sub-channel 1. Devices C and F will listen during their respective sub-channels. FIG. 17b at 1700b shows down channel 6 (as shown with reference to FIG. 6). During down channel 6 1700b, at the first sub-channel 1705a, R listens on its EMG channel for any lost or new devices within range. R then listens to C in its Sub-Channel 0 1710a, while C talks to R. R then listens to F in sub-channel 1 1715a., while F talks to R. C knowns to only listen during sub-channel 0, F knows only to listen in sub-channel 1, and so can be asleep when not otherwise occupied. Though the illustrated embodiments show the SYNC 1705a and EMG 1705b sub-channels at the beginning of the associated up and down channels, the SYNC 1705a and EMG 17 may be anywhere within the sub-channels.

This arrangement of up and down channel groups, each divided into up channels and down channels, those themselves divided into sub-channels for each possible device on the device mesh network allows devices to spend most of their time quiescent, only waking at known times to talk to their parents and children, listen to their parents and children, broadcast or listen for the sync; broadcast (if needing a new parent), and listen to the EMG. C, for example will only listen to 4 up channels and down channels; within the up and down channels, C will listen to only 2 of the three channels. This device mesh and channel construction has the effect that the network mesh trees (e.g., as shown in FIGS. 5 and 6) may be flattened out into a time line which repeats once it is finished, cycling at a regular rate, as shown with reference to FIGS. 8 and 9.

Figure 18:
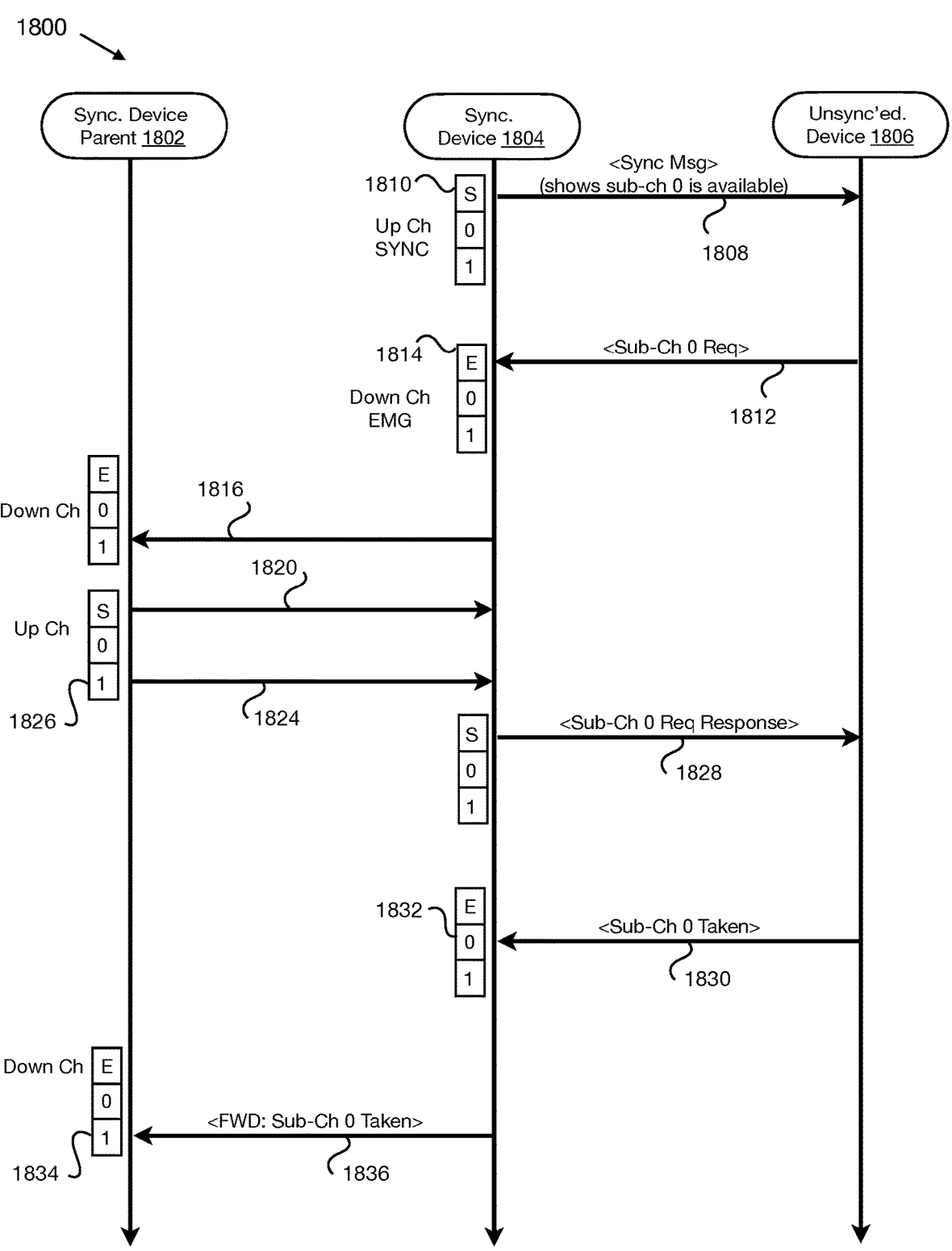
FIG. 18 illustrates an example of incorporating a new device into a mesh network.

FIG. 18 at 1800 illustrates an example of a new device auto-enrolling into a mesh network. N (network branch)=2 in this embodiment, so there are two sub-channels in each channel. An unsynchronized device (e.g., a lost device, a new device, etc.) 1806 may listen for devices. In some embodiments, rather than listening at all times, because the unsynchronized device 1806 understands the structure of the channels, it may be able to determine when the sync messages are sent out. Therefore, it may be able to listen and only use energy when necessary. In some embodiments, before enrolling an unenrolled device may passively listen until it hears a message.

An unsynchronized device listens for a sync message. It may listen for each sync message associated with each sub-channel, or may only listen to some sync channels. Some embodiments of the Sync message 1808 are shown with reference to FIG. 28. When the unsynchronized device 1806 hears a sync message 1808 from a device in the network 1810 (e.g., a sync Sub-Channel 1015 as shown with reference to FIG. 10), it will unpack the message, in some embodiments, to find: a network timestamp, the sending device's up channel numbers, the network configuration parameters N (network branches) and H (network Depth), and whether or not the device may take on a new internal number—i.e., there is an available Sub-Channel. In some embodiments, the sending device's up channel number is not included. Rather, the device may be able to determine the parent up-channel through a different way. For example, the current time may be moduloed against a single cycle length. This cycle length may include sub-channel duration. Some embodiments may also include channel spacing, sub-channel spacing, or a different sort of spacing. This information may be sufficient to: know exactly when each and every channel shall occur, which channel numbers are valid as a child of the device which sent the sync message, and whether or not it should request to be the device's child or continue searching for other devices. This is described with reference to FIGS. 5-17b and the surrounding text. In some embodiment, the sync message has more or less information.

Using N (network branches) and H (network depth), the network configuration (e.g., as shown with reference to FIG. 1) can be drawn with the location for each up channel and down channel device for a device, e.g., the unsynchronized device 1806. Using this information, the up channel and down channel groups and the sub-channels of each of the up and down channels can be determined. Some embodiments of this are described in greater detail with reference to FIGS. 20-22. In some embodiments, there is a fixed sub-channel duration that is known beforehand. In some embodiments, there is a fixed channel duration that is known beforehand. In such instances, in some embodiments, the fixed durations are not included in the sync message. In some embodiments, one or more of the spacings may be sent during the sync message.

If the synchronized device's message indicates an opening for a child, the unsynchronized device will send a sub-channel request 1812 during the synchronized device's 1804 down-emergency-sub-channel 1814 (e.g., EMG 1110 as shown with reference to FIG. 11). Some embodiments of the sub-channel request are shown with reference to FIG. 25. The synchronized device 1804 will then send out a message 1816 to the synchronized device's parent device 1802 during the time the synchronized device talks to its parent device. The sync device parent device 1802 sends a sync message 1820 to its child (e.g., sync. device 1804) and then talks to its child 1824 in a sub-channel request response (e.g., embodiments as shown with reference to FIG. 25) during the parent's sub-channel 1826 indicating that the sub-channel request is either approved or denied depending on if the requested sub-channel is still available. The child (sync. device 1804) then sends a sub-channel taken response 1828 to the unsync. device 1806 during its sync sub-channel. One embodiment of the sub-channel request response is shown with reference to FIG. 26. In some embodiments, if the unsynchronized device 1806 is accepted, the sub-channel request message will indicate which of the sub-channels is being allocated, as the original sub-channel might have been filled in the meantime, but another sub-channel may be available. In some embodiments, the originally requested sub-channel will be automatically allocated when the unsynchronized device is accepted, so this information may not appear in the message.

According to various embodiments, after the unsynchronized device 1806 has been accepted, it may acknowledge ownership by sending a sub-channel taken response 1830 during its allocated sub-channel in its parent's down channel 1832. As the example unsynced device 1806 has requested sub-channel 0 of the synched device 1804, it will send the sub-channel taken response during its now-parent's 1804 0 sub-channel. An embodiment of the sub-channel taken response is shown with reference to FIG. 27. The device 1806 will also assign itself an up and down channel corresponding to its place in the network according to the the network tree configuration. Once the synchronized device 1804 has received the sub-channel taken response confirmation from a newly accepted child device 1806, it will forward the sub-channel taken response 1836 during its parent's dedicated listen sub-channel 1834, then through the linked set of subsequent parent's down channels to the root, through all of its ancestor devices, indicating that a new device has been incorporated into the network. This allows the root to keep track of the network state. If the unsynchronized device 1806 is not accepted, it will resume scanning for another sync message from other devices at sync message times. In some embodiments, at other times the device is quiescent.

The energy consumption required by the network may be tuned by changing the tree configuration. The major influences on energy consumption are the frequency of the up-down channel group cycles, and the amount of time required to listen with the radio for each sub-channel. The up-down channel group cycle time influences the rate of listening and sending of messages and its period is dictated by the number of allocated channels in the tree, the timing in the spacing between channels, and the duration of each sub-channel window. One can reduce power consumption by increasing the spacing between each channel, and reducing the duration of each sub-channel to the minimum possible without sacrificing timing reliability.

Figure 19:
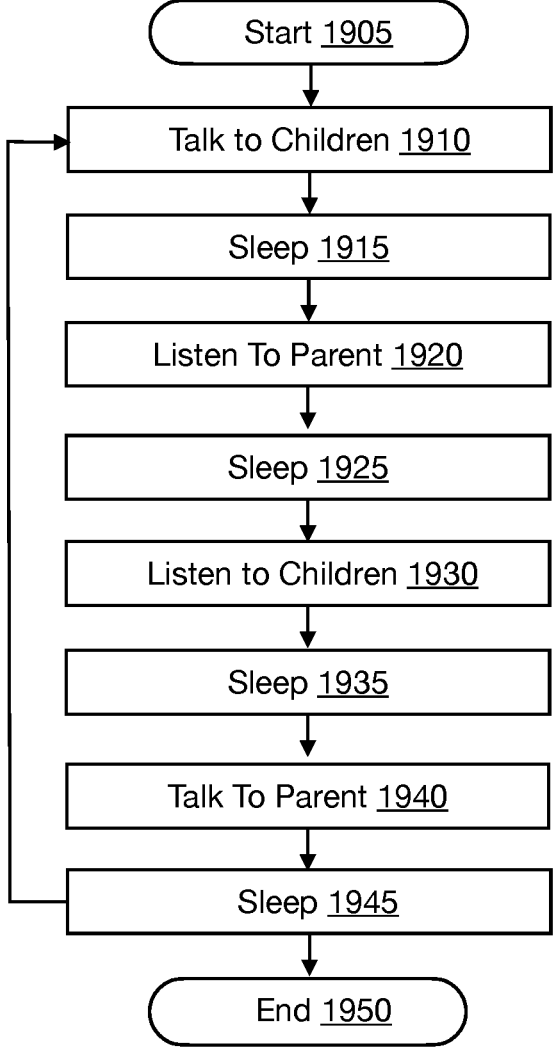
FIG. 19 illustrates an example of the behavior of a device after it has been enrolled into a synchronized network.

FIG. 19 illustrates an example flowchart of the behavior of a device, e.g., 400, after it has been enrolled into a synchronized network 1900; i.e. it has become synched. In various embodiments, the behavior of the device may be determined by a processor 440 within the device; a processor 220 within a controller 310, 315, 320, within a distributed system, a single processor, a single controller, etc. Various alternative arrangements and methods of device behavior after enrollment will be apparent. This behavior may allow the device to spend a large part of its time asleep, saving energy, while still remaining in sync with and performing all the duties necessary for being in the synchronized mesh.

The flowchart starts at step 1905. At 1905, the synched device wakes up at a talk to children time. This talk to children time may be known from a previous iteration, where a sync message 2800 such as shown in FIG. 28, was sent to the device by another device, by a processor within a distributed system, etc. The sync message may be sent, for example, at a known time, e.g., the up channel Sync message shown at 1705a and sent during an up channel sync 1505a time, or at another time. At 1915, the synched device may discover a new sync message 2800 has been sent to it, and may read it. Within this message may be a new sync time (e.g., as shown within a field in the sync message 2800 such as the network sync time field 2805), which may be the current clock time or a different time. Using the information in the sync message 2800, the device constructs its communication channel, or refers to a currently constructed communication channel (as described in more detail with reference to FIGS. 8-10). This allows the device to know what time to perform various functions, e.g., talk to its children 1910, listen to parent 1920, listen to children 1930, talk to parent. In between each of these timed functions, the device may go to sleep, e.g., 1915, 1925, 1935, 1945. This allows the device to save energy. After the sleep cycle 1945, the cycle repeats, and will continue cycling until the system is switched off, a parameter (such as the message values shown in the sync message 2800, or something else) interrupts the continuous cycle. At 1950, the cycle ends. The order of the functions (talk to children, listen to parent listen to children, talk to parent), and the functions themselves, may vary in implementations.

FIG. 20 illustrates an example of a method 2000 for determining a communications group, e.g., as described with more detail in FIG. 8. This method may be performed when creating the first node in a new mesh, automatically enrolling a node into a mesh, etc., when a device (such as a sensor) is pre-enrolled into a mesh, etc. In various embodiments the method 2000 may be performed in one or more functions in memory available to devices that may enroll in a communications channel such as taught herein. Such a function may be a parameterized equation. In some embodiments, sync time (e.g., shown with reference to FIG. 28 at 2805) In various embodiments, this method is performed at a different time. In various embodiments, the method 2000 may be performed by a processor 440 within the device; a processor 220 within a controller 310, 315, 320, within a distributed system, a single processor, a single controller, etc. Various alternative arrangements and methods of determining sub-channel timing will be apparent.

The method begins in step 2005, and then continues to step 2010 where information to produce timing for a communications channel is ascertained. This information may come from a sync message (e.g., FIG. 28), or may be located elsewhere, such as in memory 220, or memory 445, etc. The information may be located in various locations, such as those listed above. The values N (network branches) and H (network depth) may be located in a sync message (e.g. FIG. 28), may be located elsewhere, such as in memory 220, or memory 445. The sub-channel length may be located in a sync message, may be located elsewhere, such as in memory 220, or memory 445. The sub-channel spacing may be located in a sync message, may be located elsewhere, such as in memory 220, or memory 445. Knowing N, H, sub-channel length and sub-channel spacing is enough information to calculate the communication channel timings as the timing of the network communication channel is constrained.

At operation 2015, using N and H, a depth-first pre order tree configuration is created— the up-channel ordering. This is described in more depth with reference to FIG. 5. In step 2020 the down-channel ordering is created using N and H. This is described in more detail with reference to FIG. 6. Once the up-channel ordering and down-channel ordering have been created, at step 2025, the communication channel may then be created. This is explained in more detail with reference to FIGS. 21a and 21b. In some embodiments, a communications channel is created to enroll a device into the net by locating an unused sub-channel, as shown in greater detail with reference to FIG. 18. At step 2030, the timing of a specific sub-channel can now be located by determining a sub-channel number, and then determining its location in the communication channel constructed in, e.g., step 2025. In some embodiments, the communications channel need not be built from scratch; rather N, H, sub-channel length, sub-channel number, and parent up-channel number can be used in a equation (such as a parameterized equation) to determine implicitly reserved up-subchannels and down sub-channels. Finally, at step 2035, the method ends.

FIG. 21*a* illustrates an example of a method 2100*a* for determining timing for an up channel communication channel from information found in a sync message. This constructed up channel communication channel may be used to determine timings that may then be used for a device to automatically enroll within a mesh that uses the up channel communication channel. In various embodiments, the method 2100*a* may be performed by a processor 440 within a device, e.g., 400, by multiple processors 440 in multiple devices, a processor 220 within a controller 310, 315, 320, within a distributed system, a single processor, a single controller, etc. Various alternative arrangements and methods of for constructing an up channel communication channel will be apparent.

The method begins in step 2105*a* and then continues to step 2110*a* where information from a sync message (e.g., FIG. 28) and other information is used to determine timing within a communication channel by constructing a version of device sub-channels. This determining timing may be performed within a function that runs within a processor 440 within a sensor 400, a processor 220 within a controller, within several controllers in a distributed system, etc. Up— and down-channels are described in more detail with reference to FIG. 10 and FIG. 15. Briefly, each device has as many sub channels as N-the number of branches, plus a Sync channel. The length of each sub-channel may be a universal constant, may be defined in the Sync Message (FIG. 28) or in another location. At step 2115*a*, the device sub-channels are assembled into an up channel, as discussed with reference to FIG. 15. At step 2120*a*, an up channel is assembled for each device, as discussed with reference to FIGS. 10, 12, and 15*a*. At step 2125*a*, the up channels are assembled into an up channel group, as discussed with reference to FIG. 9. In some embodiments, the up channels may be assembled in depth-first pre-ordering, as discussed elsewhere. In some embodiments, the up channels may be assembled in a different ordering.

Figures 21B, 22:
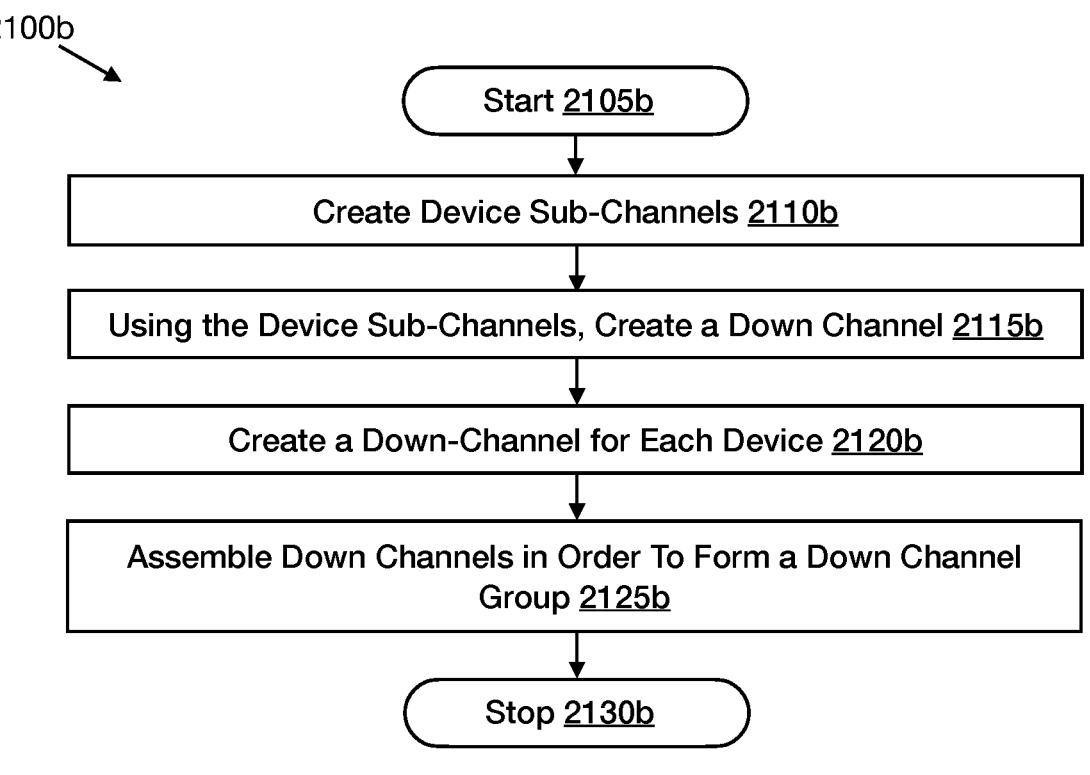
FIG. 21b illustrates an example of a method for constructing a down channel communication channel from information found in a sync message.
FIG. 22 illustrates an example of a method for constructing a communication channel from an up channel group and a down channel group.

(1) FIG. 21*b* illustrates an example of a method 2100*b* for constructing a down channel communication channel from information found in a sync message. This constructed down channel communication channel may be used to determine timings that may then be used for a device to automatically enroll within a mesh that uses the down channel communication channel, etc. In various embodiments, the method 2100 may be performed by a processor 440 within the device, e.g., 400, by multiple processors 440 in multiple devices, a processor 220 within a controller 310, 315, 320, within a distributed system, a single processor, a single controller, etc. Various alternative arrangements and methods of constructing a down channel communication channel from information found in a sync message will be apparent.

(2) The method begins in step 2105*b* and then continues to step 2110*b* where information from a sync message (e.g., FIG. 28) and other information is used to create device sub-channels. This is described in more detail with reference to FIG. 10 and FIG. 15. Briefly, each device has as many sub channels as N-the number of branches, plus a EMG channel. The length of each Sub-Channel may be a universal constant, may be defined in the Sync Message (FIG. 28) or in another location. At 2115*b*, the device sub-channels are assembled into a down channel, as discussed with reference to FIGS. 11, 13, and 15*b*. At 2120*b*, a down channel is assembled for each device, as discussed with reference to FIG. 9. At 2125*b*, the individual down channels are assembled into a down channel group, as discussed with reference to FIG. 9. at 2130*b*, the method stops. In some embodiments, the down channels may be assembled in depth-first post-ordering, as discussed elsewhere. In some embodiments, the down channels may be assembled in a different ordering.

FIG. 22 illustrates an example of a method 2200 for constructing a communication channel, an up channel group and a down channel group. In various embodiments, the method 2100 may be performed by a processor 440 within a device, e.g., 400, by multiple processors 440 in multiple devices, a processor 220 within a controller 310, 315, 320, within a distributed system, a single processor, a single controller, etc. Various different types of communication channels may be created, as described with reference to FIGS. 29-31 and the surrounding text. Various alternative arrangements and methods of constructing a communication channel, an up channel group and a down channel group will be apparent.

The method begins in step 2205 and then continues to step 2210 where an up channel group (e.g., as described with reference to FIG. 2100*a*) and a down channel group (e.g., as described with reference to FIG. 2100*b*) are arranged next to each other, such as shown with reference to FIG. 9. At step 2215, the communication channel is then repeated. This repetition of up channel groups and down channel groups all at known times creates a communication channel where information contained in a sync message 2800 can be used to determine times for an unsynchronized device to automatically enroll itself into a synched mesh.

Figure 23:
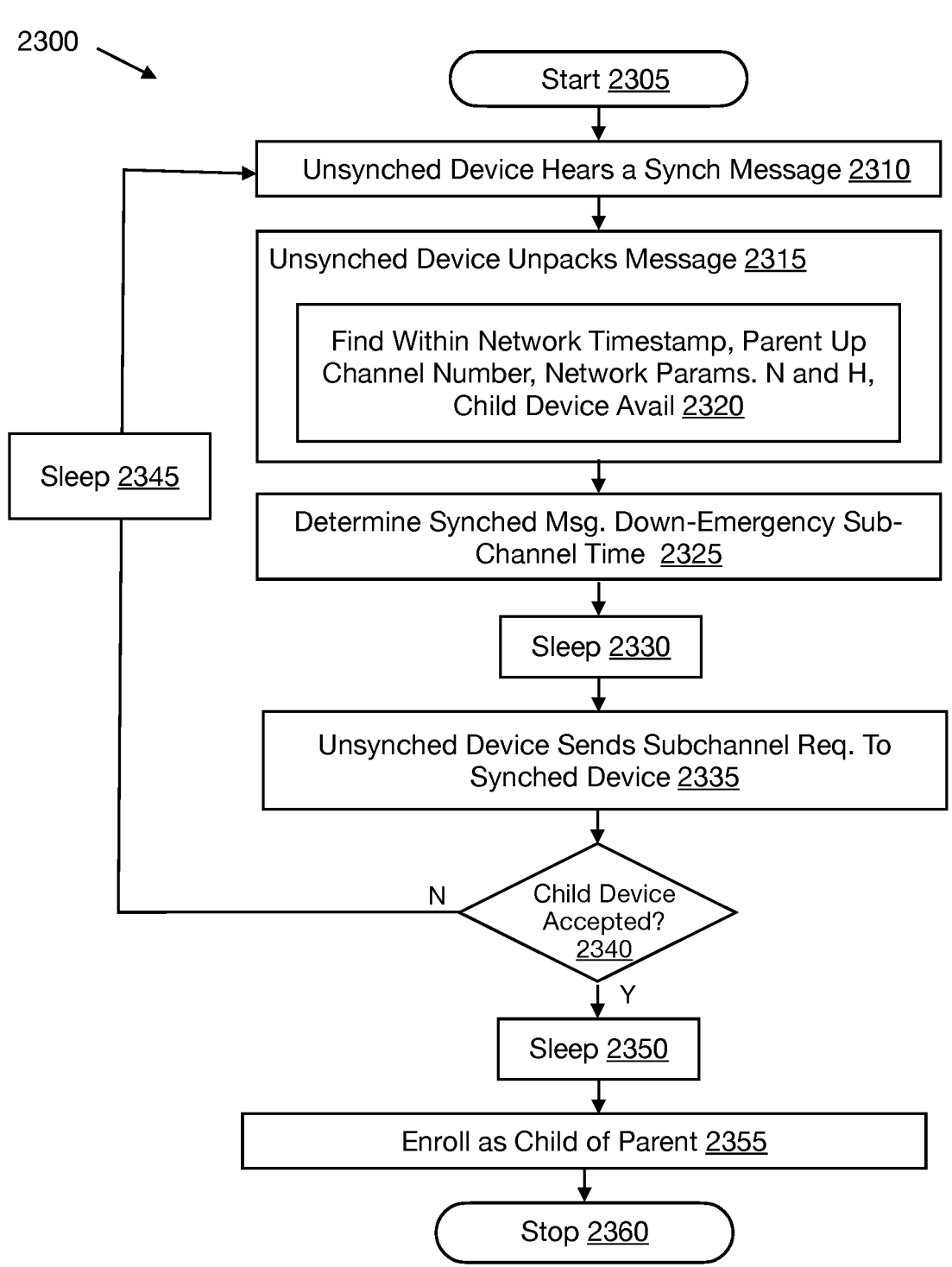
FIG. 23 illustrates an example of a method for an unsynchronized device to automatically enroll into a synchronized mesh network.

FIG. 23 illustrates an example of a method 2300 for an unsynchronized device (e.g. 1806) automatically enrolling into a synchronized mesh network. In various embodiments, the method 2300 may be performed by a processor 440 within the device; by multiple processors 440 in multiple devices running in a distributed system, a processor 220 within a controller 310, 315, 320, within a distributed system, a single processor, a single controller, etc. Various alternative arrangements and methods of automatically enrolling will be apparent.

The method begins in step 2305 and then continues to step 2310 with an unsynchronized device (e.g. 1806) hearing a synchronization message from a previously-synchronized device (e.g. 1804) within a synchronized mesh network. The network may be arranged such that communication channels are laid out as described with reference to FIGS. 9 and 15, and such that the position of communication time for a given device can be determined. How to determine the communication time is described elsewhere. Examples of such descriptions may be found with reference to FIGS. 10-15 and their surrounding text, and FIGS. 20-22 and their surrounding text. The unsynchronized device (e.g. 1806) may be listening for a sync message at specific times, may be constantly listening for a sync message, may be randomly listening for a sync message, etc. In some embodiments, the unsynchronized device may listen constantly until it finds a first sync message. Then, using information in the sync message and information available elsewhere, the unsynchronized device determines which times should be used to listen. At step 2315, the unsynchronized device (e.g., 1806) unpacks the sync message. This sync message may contain, as shown at step 2320, a network timestamp, an up channel number, and the network parameters N and H. Other information may be in the Sync message as well. These numbers N and H may be used to determine the parent up-channel number. The specific time the unsynchronized device needs to send a enrollment request (e.g., 1812) in the synchronized mesh may be determined by using an equation that itself takes the values N, H, parent up-channel number, and sub-channel length along with an available sub-channel (e.g. 2810). Some embodiments also use a network sync time as a value to determine enrollment request time (e.g., 1812). Other times for a device to interact with the synchronized mesh may also be determined using similar equations. Some embodiments of the sync message are described with reference to FIG. 28. In some embodiments, the unsynchronized device (e.g., 1806) determines if the message owner (e.g., a synchronized device 1804) has an open space in its mesh network. This might be a message that a child space is available, which child spaces are taken, that a sub-channel is available, etc. In some embodiments, the sync message 2800 contains a field 2810 that lists which sub-channels are available. In some embodiments, the field 2810 comprises an approval indication that a sub channel is available. In some embodiments, the approval indication may be yes/no indication. In some embodiments, the yes/no indication may comprise a field having a number in it that corresponds to one or more sub-channels being available. In some embodiments, the unsynched device only unpacks or otherwise determines N, H, the sub-channel length, the sub-channel number, and the parent up-channel number. Using this information and the current time, a function or functions can be used to determine the up-sub-channel and the down sub-channel that has been reserved. In some embodiments, where in the network cycle the start and end times for its up sub-channels and down sub-channels, may also be determined from N, H, the sub-channel length, the sub-channel number, and the parent up-channel number.

At step 2325, the unsynchronized device learns the time to send a message to the synched device (e.g., 1804) that sent the sync message (e.g. 1808). This may be referred to as the "talking time." This talking time can be determined by finding out the synched device down EMG sub-channel. As shown with reference to FIGS. 20-21b, this EMG channel can be determined using the information found in the Sync message. For example, the unsynchronized device (e.g., 1806) may use information from the sync message including the network parameters N and H, and a network timestamp. In some embodiments, at step 2330 the unsynchronized device may now fall asleep. At step 2335, the unsynchronized device (e.g., 1806) may wake up at the talking time and then send a request to enroll in the mesh by becoming a child of the synchronized device (e.g., 1804). At decision point 2340, the unsynchronized device determines if it has been accepted as a child of the synchronized device (e.g. 1804). In some embodiments, this may entail the unsynchronized device receiving a sub-channel request response, an example of which is show in FIG. 26. The sub-channel request response may include a field that tells in some fashion if the unsynchronized device has been accepted as a child of the synchronized device. This may be a boolean value, or another sort of value. If the request is not accepted, then at step 2345 the device sleeps, returns to the start at 2305 and then wakes up to listen to another sync message. If the request is accepted, then, at step 2350, the unsynchronized device (e.g., 1806) falls asleep, wakes at the enrollment time, and then enrolls as a child of the synchronized device (e.g. 1804). At step 2360, the method stops.

Figure 24:
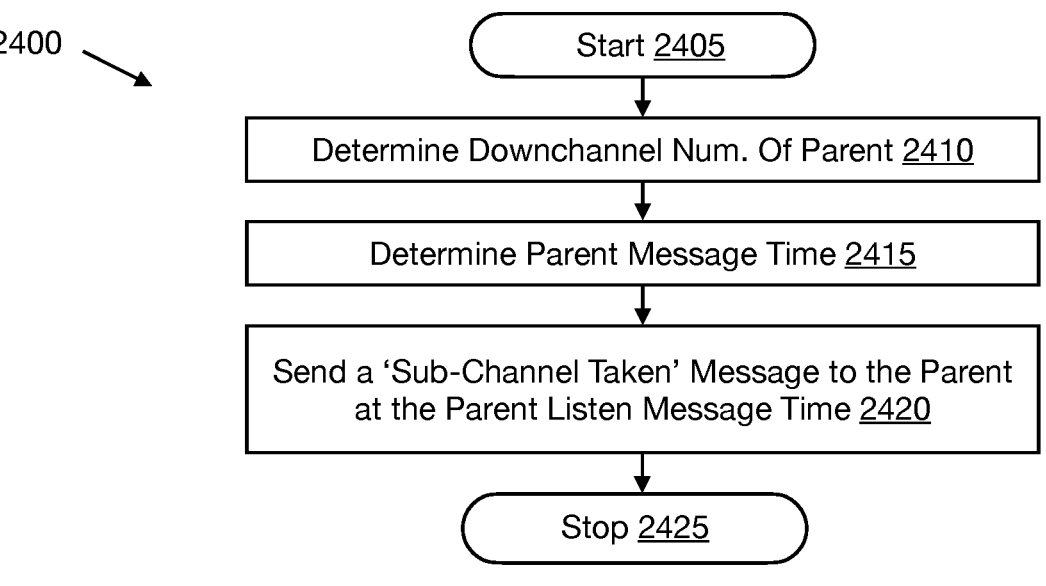
FIG. 24 illustrates an example of a method for an unsynchronized device to enroll as a child of a synchronized parent.

FIG. 24 illustrates an example of a method 2400 for an unsynchronized device (e.g. 1806) enrolling as a child of a synchronized parent. In various embodiments, the method 2400 may be performed by a processor 440 within the device; by multiple processors, a processor 220 within a controller 310, 315, 320, within a distributed system, a single processor, a single controller, etc. Various alternative arrangements and methods of enrolling will be apparent.

The method begins in step 2405 and then continues to step 2410 where the down-channel number of the parent is determined. With reference to FIGS. 5 and 6 and the surrounding text, using the up-channel number that may be found in the Sync Message (e.g., Sending Device Up-Channel 2815) previously received, the device may determine the down-channel number of the parent (e.g., the synchronized device 1804). At step 2415, the time to send a message to the now-parent can be determined. Once the down channel number has been determined, then the time to send a message the new parent device (e.g., the synchronized device 1804) can be determined. Examples of how to do this is described with reference to FIGS. 5, 6, and 20-22 and the surrounding text. After the time to send a message to the parent has been determined, at step 2420, the device may sleep until the parent listening time, at which a 'sub-channel taken' response message may be sent to the parent 720, 1945. In some embodiments, this 'sub-channel taken' response message may include information to identify the parent who has accepted the formerly unsynchronized device as a child device. In some embodiments this may include the parent channel number. This number may be sufficient in some systems to identify the specific device that has accepted the child. In some embodiments, other information may be included. Then, at step 2425, the method stops.

In some embodiments, the now parent of the previously unincorporated device sends a message to its parent to inform it of the new makeup of the synchronized mesh. This message is sent down the mesh to the root.

Figure 25:
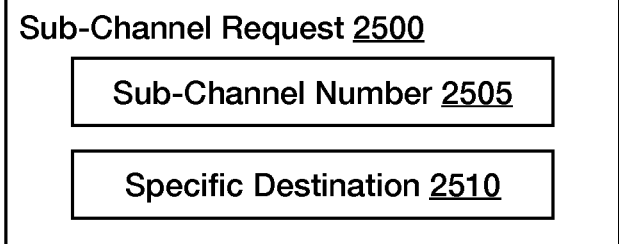
FIG. 25 discloses an embodiment of a sub-channel request.

FIG. 25 discloses an embodiment of a sub-channel request, such as the request shown in FIG. 18 at 1812. Some embodiments may include more or fewer fields. For example, the sub-channel request 2500 may include a sub-channel number 2505. This number 2505 may be used to determine where within a synchronized mesh network this particular device is asking to reside. In some embodiments, this sub-channel number 2505 may be an up-channel number (e.g., see FIG. 5 and the surrounding text); in some embodiments, this sub-channel number 2505 may be a down-channel number (e.g., see FIG. 6 and the surrounding text). In some embodiments, a different field may be used to specify a location within the synchronized mesh network. This sub-channel number 2505 may be a number that was initially received in the sync message 2800 as an available sub-channel 2810. If there are multiple available sub-channels, then the sub-channel number may be chosen as one of the possible available sub-channels. In some instances, this number may be the first available sub-channel, it may be a random available sub-channel, the smallest number within the sub-channels, or the sub-channel may be chosen in a different manner. In some embodiments, a specific destination 2510 may be included in this sub-channel request. This may be another way to determine the specific synchronized device that is being requested. Other fields may also be included in some embodiments. Fields may also be excluded in some embodiments. For example, some embodiments may only include the sub-channel number 2505, while other embodiments may only include the specific destination 2510. When the sub-channel number 2505 is included, some embodiments may specify an up channel number, while other embodiments may specify a down channel number. Some embodiments may specify the sub channel using a different method.

Figure 26:
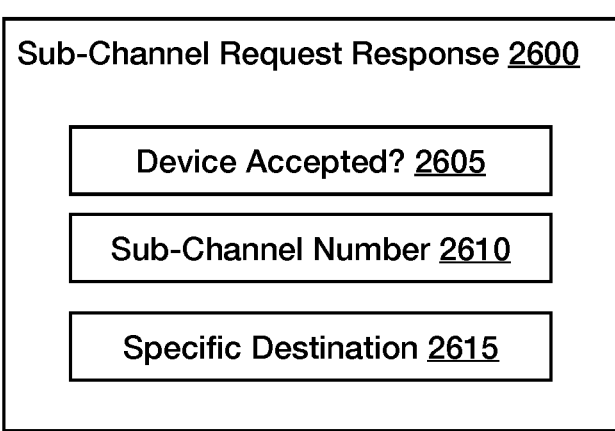
FIG. 26 discloses an embodiment of a sub-channel request response.

FIG. 26 discloses an embodiment of a sub-channel request response, such as the request response shown in FIG. 18 at 1828. In some embodiments this may be called a response message. Some embodiments may include more or fewer fields. The sub-channel request response 2600 may include a field 2605 that indicates whether or not an unsynchronized device (e.g. 1806) has been accepted as a child of a synchronized device. This field 2605 may be a boolean, or a different data type. This field 2605 may indicate if the sub-channel request has been accepted. Some embodiments may include a sub-channel number 2610. An earlier sub-channel number 2505 may have been included in the sub-channel request, which is the sub-channel number that the unsynchronized device may be requesting. However, between the time of the initial request, e.g., 1812 and the sub-channel request response e.g., 1828, the sub-channel number that is available may change. In such a case, the sub-channel number 2610 in the sub-channel request response 2600 may be different than the sub-channel number in the sub-channel request 2500. This number 2610 may be used to determine where within a synchronized mesh network this particular device resides. In some embodiments, this sub-channel number 2610 may be an up-channel number; in some embodiments, this sub-channel number may be a down-channel number. In some embodiments, a different field may be used to specify a location within the synchronized mesh network. In some embodiments, a specific destination 2615 may be included in this sub-channel request. This may be another way to determine the specific synchronized device that is being requested. Other fields may also be included in some embodiments. Fields may also be excluded in some embodiments. For example, some embodiments may only include the Device Accepted field 2605. When the sub-channel number 2610 is included, some embodiments may specify an up channel number, while other embodiments may specify a down channel number. Some embodiments may specify the sub channel using a different method.

FIG. 27 discloses an embodiment of a sub-channel taken response 2700, such as the taken response shown with reference to FIG. 18 at 1830 and 1832. In some embodiments, the sub-channel taken response is referred to as a parent response. Some embodiments may include more or fewer fields. The sub-channel taken response may include a device ID 2705 that more specifically identifies the device that has now become a part of the synchronized mesh. Some embodiments may include a parent channel number 2710. This may be an up channel number, e.g., as shown with reference to FIG. 5, the down channel number, e.g., as shown with reference to FIG. 6, or a different number. This number may be used to determine who the parent of this new device is. In some embodiments, a parent sub-channel number 2715 may be included. This may detail which child this device is the parent of. This may be an up sub-channel number, e.g., as shown with reference to FIG. 15*a*, a down sub-channel number, e.g., as shown with reference to FIG. 15*b*. There may be cases where an original sub-channel number 2505 included in a sub-channel request 2500 may not be available by the time the request is received, but another sub-channel may be. This field may then indicate a different sub-channel than that originally requested. Other fields may also be included in some embodiments. Fields may also be excluded in some embodiments. For example, some embodiments may not include the parent sub-channel number 2715.

FIG. 28 discloses an embodiment of a sync message 2800 such as the sync message shown with reference to FIG. 18 at 1808. Some embodiments may include more or fewer fields than those shown. The sync message 2800 may include network sync time 2805. This network sync time 2805 may be a current timestamp or may be a different number that may be used to synchronize a network. Some embodiments may include available sub-channels 2810. This number may be used to allow an unsynchronized device to determine if this synchronized device will accept a child device. For example, if there are no available sub-channels, then this sync message will not be able to be used for an unsynchronized device to sync to the given synchronized mesh network. In some instances, there may be multiple available sub-channels. In such a case, in some embodiments, the sub-channel request response 2600 may specify in a sub-channel number 2610 which of the possible sub-channels the unsynchronized device has been invited to join. In some embodiments, this sub-channel number may be an up-sub-channel number, e.g., as shown in FIG. 17*a*; in some embodiments, this sub-channel number may be a down-sub-channel number, e.g., as shown with reference to FIG. 17*b*. In some embodiments, this field may be omitted. In some embodiments, a different field may be used to specify a location within the synchronized mesh network. In some embodiments, the network branches (N) 2815, the network depth (H) 2820, and the sending device up channel 2 2825 may be included. As disclosed elsewhere, these fields may be used to determine a specific time that an unsynchronized device may send a sub-channel request 2500 to ask to be automatically enrolled within this synchronized mesh network. In some embodiments, sub channel duration 2830; may also be specified. In some embodiments, other information may also be included, such as sub-channel Length 2835 (an example is shown in FIG. 10 at 1030), sub-channel spacing 2840 (an example is shown in FIG. 9 at 940, and other times that may be required to determine time to send a sub-channel request 2500 or a similar request.

Figure 29:
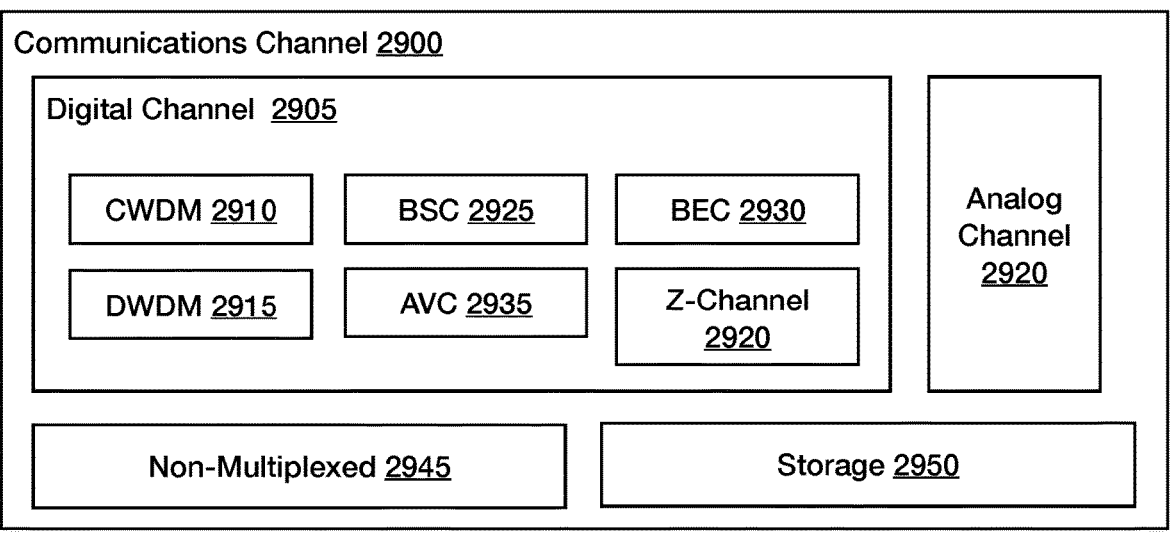
FIG. 29 illustrates an example of possible communication channels.
Figure 30:
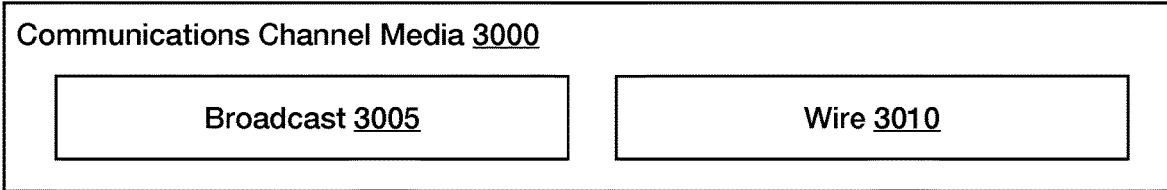
FIG. 30 illustrates an example of possible communications channel media.
Figure 31:
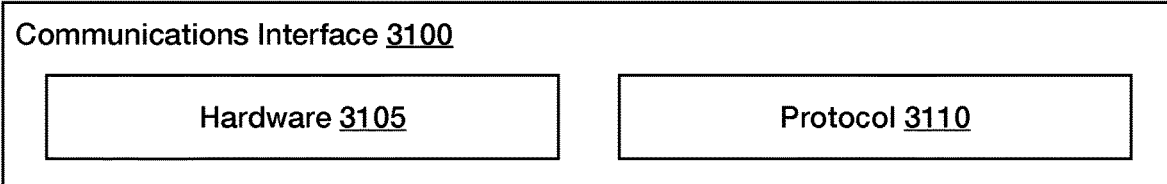
FIG. 31 illustrates an example of possible communication interfaces.

FIGS. 29, 30, and 31 describes communications channels, media, and interfaces that may be used in embodiments described herein. In some implementations, communications channels may be divided into sub-channels. Communication channels are, generally, media through which information is sent. The communications channels should be able to be implemented on any shared medium in time. For example, communication channels may be storage devices 2950. With a storage device, information may be sent to it, and retrieved from it—sending a message over time. A communications channel may be digital 2905. Examples of digital channel models include Binary symmetric channel (BSC) 9295, Binary erasure Channel (BEC) 2930, packet erasure channel, arbitrarily varying channel (AVC) 2935, Z-Channel 2920, etc. Other communications channels that may be used with embodiments disclosed herein include Additive white Gaussian nose channels (AWGN), Interference models, distortion models, Frequency response models, including attenuation and phase shift, group delay models. Wavelength division 2905 is also envisioned, as is done, e.g., using fiber optic cables. Different wavelength division techniques may be used, such as, e.g., Coarse Wavelength Division Multiplexing (CWDM), Dense Wavelength Division Multiplexing (DWDM), etc. A communications channel may use frequency division, as is used, e.g., in broadband. Frequency-division multiple access (FDMA), Code-division multiple access (CDMA), Gaussian Derivative Frequency Modulation (GDFM), etc. Communications channel media 3000 that may be used include broadcast media 3005 and wire media 3010. Wire media may include transmission lines such as twisted-pair, coaxial, and fiber-optic cable. Broadcast media may include radio, satellite, microwave, and infrared.

Communications interfaces that may be used include hardware interfaces 3105, protocols 3110, etc. These communications interface 3100 may use any appropriate communications media 3000, the media using any of the appropriate communications channels 2900.

It should be apparent from the foregoing description that various example embodiments of the invention may be implemented in hardware or firmware. Furthermore, various example embodiments may be implemented as instructions stored on a non-transitory machine-readable storage medium, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, and the like represent various processes which may be substantially represented in machine readable media and so executed by a computer or processor, whether or not such computer or processor is explicitly shown.

Although the various example embodiments have been described in detail with particular reference to certain example aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

I claim:

1. A method performed by a device to add the device to an existing device mesh network, comprising:
   receiving a sync message that a sub-channel is available;
   using information in the sync message, determining a talking time;
   sending a sub-channel request message at the talking time;
   receiving a response message;
   when an indication in the response message indicates approval of the sub-channel request message, then the device enrolling itself as a child of a sender of the sync message;
   wherein the sync message is a broadcast message;
   wherein the response message comprises: an approval, and an available sub-channel number; and
   wherein the information in the sync message comprises: an available sub-channel, a sending device up channel number, a network branch number, a network sync time, and a network depth number.

2. The method of claim 1, wherein the device enrolling itself as a child of the sender of the sync message comprises:
   using the network branch number, the network depth number and the sending device up channel number to determine a down channel number;
   using the down channel number, determine a parent sub-channel response time; sleeping;
   waking at the parent sub-channel response time; and
   sending a sub-channel taken message at the parent sub-channel response time.

3. The method of claim 2, wherein using the network branch number, the network depth number and the sending device up channel number to determine a down channel number comprises using the network branch number and the network depth number to build a depth-first post-ordered tree that associates the sending device up channel number with the down channel number.

4. The method of claim 3, further comprising using a sub-channel duration, the sending device up channel number and the down channel number to build a complete up channel group and a complete down channel group; using the complete up channel group and the complete down channel group to determine a down EMG sub channel time; and using the down EMG sub channel time to determine the talking time.

5. The method of claim 4, wherein receiving a response message comprises the device waking up during a sync channel time of the sender of the sync message.

6. The method of claim 5, further comprising sleeping between the sending a sub-channel request message at the talking time and the receiving a response message.

7. A device, comprising:
   a memory; a communications interface; and
   a processor in communication with the memory and the communications interface, the processor being configured to:
   receive, via the communications interface, a sync message that comprises a sub-channel number;
   using information in the sync message, determine a parent response time;
   sleep;
   wake from sleeping at the parent response time;
   send a request message at the parent response time, the request message comprising the sub-channel number;
   wake from sleeping at a response message time;
   receive a response message comprising an approval indication, and an available sub-channel number; and
   when the approval indication is positive, then the device assigning itself to a sender of the sync message.

8. The device of claim 7, wherein the sub-channel number is the same as the available sub-channel number.

9. The device of claim 8 wherein the device assigning itself to a sender of the sync message comprises:
   determining a parent listening time;
   sleeping; and
   waking from sleep at the parent listening time and sending a sub-channel taken message to the sender of the sync message.

10. The device of claim 9, wherein the sub-channel taken message comprises a device ID, and the available sub-channel number.

11. The device of claim 10, wherein the information in the sync message comprises: a network branch number, a network depth number, a sending device up channel number, and a network sync time.

12. The device of claim 11, wherein the response message time comprises a sync sub-channel time of the sender of the sync message.

13. The device of claim 12, wherein determining the parent listening time comprises:

using the network branch number, the network depth number, the sending device up channel number, and the network sync time to determine a down channel of the sender of the sync message; and using the down channel of the sender of the sync message to determine the parent response time.

14. The device of claim 13, wherein the parent response time comprises a down channel available sub-channel time.

15. The device of claim 13, wherein a parent response comprises the sending device up channel number and the available sub-channel number.

16. A non-transitory machine-readable medium comprising:

instructions for receiving, via a communications interface, a sync message that comprises a sub-channel number;

instructions for determining a parent response time using information in the sync message;

instructions for sleeping;

instructions for waking from sleeping at the parent response time;

instructions for sending a request message at the parent response time, the request message comprising the sub-channel number;

instructions for waking from sleeping at a response message time;

instructions for receiving a response message comprising a yes/no indication, and an available sub-channel number; and instructions for assigning to a sender of the sync message when the yes/no indication is a yes.

17. The non-transitory machine-readable medium of claim 16 wherein assigning to a sender of the sync message comprises:

instructions for determining a sub-channel taken response time;

instructions for waking from sleep at the sub-channel taken response time; and instructions for sending a sub-channel taken response at the sub-channel taken response time.

18. The non-transitory machine-readable medium of claim 17, wherein the sync message further comprises a network branch number.

19. The non-transitory machine-readable medium of claim 17, wherein the sync message further comprises a sending device up channel number.

20. The non-transitory machine-readable medium of claim 17, wherein the sync message further comprises a network depth number.

* * * * *